US011290896B2

(12) United States Patent
Malladi et al.

(10) Patent No.: US 11,290,896 B2
(45) Date of Patent: Mar. 29, 2022

(54) METHOD AND APPARATUS FOR ENHANCED NEW CARRIER TYPE IN WIRELESS COMMUNICATION SYSTEMS

(71) Applicant: QUALCOMM Incorporated, San Diego, CA (US)

(72) Inventors: Durga Prasad Malladi, San Diego, CA (US); Yongbin Wei, San Diego, CA (US); Peter Gaal, San Diego, CA (US); Hao Xu, San Diego, CA (US); Tao Luo, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 767 days.

(21) Appl. No.: 13/801,358

(22) Filed: Mar. 13, 2013

(65) Prior Publication Data
US 2014/0120893 A1 May 1, 2014

Related U.S. Application Data

(60) Provisional application No. 61/721,338, filed on Nov. 1, 2012.

(51) Int. Cl.
*H04W 76/27* (2018.01)
*H04W 24/02* (2009.01)
(Continued)

(52) U.S. Cl.
CPC ....... *H04W 24/02* (2013.01); *H04W 52/0206* (2013.01); *H04W 24/08* (2013.01);
(Continued)

(58) Field of Classification Search
CPC ... H04W 24/02; H04W 76/046; H04W 24/08; H04W 48/08; H04W 48/16; H04M 1/73
See application file for complete search history.

(56) References Cited

U.S. PATENT DOCUMENTS 8,200,173 B2 6/2012 Howard et al.
8,233,926 B2 7/2012 Heath et al.
(Continued)

FOREIGN PATENT DOCUMENTS

EP 2416608 A1 2/2012
JP WO 2012063834 A1 * 5/2012 ........ H04W 52/0206
(Continued)

OTHER PUBLICATIONS

LTE; Evolved Universal Terrestrial Radio Access (E-UTRA); Potential solutions for energy saving for E-UTRAN (3GPP TR 36.927 version 10.1.0 Release 10); 2011-10.*
(Continued)

*Primary Examiner* — Lester G Kincaid
*Assistant Examiner* — Dung L Lam
(74) *Attorney, Agent, or Firm* — Norton Rose Fulbright US LLP

(57) ABSTRACT

Systems and methods providing an enhanced new carrier type (eNCT) operable to adapt cells of a wireless communication network for opportunistic behavior that adapts to the geo-temporal traffic distribution are disclosed. Embodiments of eNCT operation provide for transmission of downlink common channels by cells employing eNCT techniques only when needed. Base stations implementing eNCT techniques herein may transition between two or more operational states, such as an active state wherein full base station functionality is performed and a dormant state wherein limited base station functionality is performed, based upon geo-temporal traffic distribution within the network. Thus, when a base station is not actively serving a user equipment (UE), the downlink transmission by the base station, and resulting interference, may be reduced or even eliminated.

25 Claims, 16 Drawing Sheets

(51) Int. Cl.
*H04W 52/02* (2009.01)
*H04W 88/08* (2009.01)
*H04W 24/08* (2009.01)
*H04W 36/00* (2009.01)
*H04W 48/08* (2009.01)

(52) U.S. Cl.
CPC ........ *H04W 36/0061* (2013.01); *H04W 48/08* (2013.01); *H04W 88/08* (2013.01); *Y02D 30/70* (2020.08)

(56) References Cited

U.S. PATENT DOCUMENTS

| | | | |
|---|---|---|---|
| 2005/0136928 A1* | 6/2005 | Zaki | H04W 36/26 |
| | | | 455/436 |
| 2006/0193373 A1 | 8/2006 | Agee et al. | |
| 2007/0173278 A1* | 7/2007 | Yoon | H04W 52/146 |
| | | | 455/522 |
| 2009/0280819 A1* | 11/2009 | Brisebois et al. | 455/446 |
| 2010/0046382 A1 | 2/2010 | Asplund et al. | |
| 2010/0061284 A1* | 3/2010 | Chen | H04W 52/146 |
| | | | 370/311 |
| 2010/0144363 A1 | 6/2010 | De Rosa et al. | |
| 2010/0322153 A1 | 12/2010 | Narasimha et al. | |
| 2012/0163305 A1* | 6/2012 | Nimbalker et al. | 370/329 |
| 2013/0135994 A1* | 5/2013 | Michel | H04W 52/0206 |
| | | | 370/229 |
| 2013/0201884 A1* | 8/2013 | Freda | H04W 72/005 |
| | | | 370/278 |
| 2013/0223317 A1* | 8/2013 | Kudo | H04W 52/0206 |
| | | | 370/311 |
| 2014/0105056 A1* | 4/2014 | Li | H04W 52/0206 |
| | | | 370/252 |

FOREIGN PATENT DOCUMENTS

| | | | |
|---|---|---|---|
| WO | WO-2010093297 A1 | 8/2010 | |
| WO | WO-2010111401 | 9/2010 | |
| WO | WO-2011025295 A2 | 3/2011 | |
| WO | WO-2011085238 A2 | 7/2011 | |
| WO | WO-2012063834 A1 * | 5/2012 | ........ H04W 52/0206 |
| WO | WO-2012076405 A1 | 6/2012 | |

OTHER PUBLICATIONS

Taiwan Search Report—TW102137178—TIPO—dated Mar. 20, 2015.
Partial International Search Report—PCT/US2913/963829—ISA/EPO—dated Mar. 6, 2014.
International Search Report and Written Opinion—PCT/US2013/063829—ISA/EPO—dated May 20, 2014.
Li Y., et al., "IEEE 802.16m on low Duty Cycle Mode of Femtocell Base Stations; C80216m-09_0821r1", IEEE Draft; C80216M-09_0821R1, IEEE-SA, Piscataway, NJ USA, vol. 802.16m, May 4, 2009 (May 4, 2009), pp. 1-6, XP017617111, [retrieved on May 4, 2009] the whole document.
Taiwan Search Report—TW104139722—TIPO—dated Sep. 2, 2016.

* cited by examiner

METHOD AND APPARATUS FOR ENHANCED NEW CARRIER TYPE IN WIRELESS COMMUNICATION SYSTEMS

CROSS-REFERENCE TO RELATED APPLICATIONS

The present application claims priority to U.S. provisional patent application Ser. No. 61/721,338 entitled "METHOD AND APPARATUS FOR ENHANCED NEW CARRIER TYPE IN WIRELESS COMMUNICATION SYSTEMS," filed Nov. 1, 2012, the disclosure of which is hereby incorporated by reference herein in its entirety.

BACKGROUND

Field

Aspects of the present disclosure relate generally to wireless communication systems, and more particularly, to an enhanced new carrier type in wireless communication systems.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems are being deployed in communities. Research and development continue to advance the UMTS technologies not only to meet the growing demand for mobile broadband access, but to advance and enhance the user experience with mobile communications.

In order to serve demand for wireless communication services, particularly high data rate services, base stations are being deployed in more and more dense configurations. For example, a large number of short-range wireless systems (e.g., pico cells) may be deployed within relatively near proximity small area (e.g., a large number of pico cells may be deployed within an area corresponding to the coverage area of a macro cell) to provide increased wireless capacity. Accordingly, a number of such base station systems may be capable of communication with a user terminal operable at any particular location. The deployment of such base stations in relatively close proximity leads to increased energy consumption, such as due to mutual interference, particularly in light of the continued active operation (e.g., transmission of pilot signals, transmission of network data via common channels, etc.) of such base stations even when no UEs are being served by the base station. Thus, network configurations employing such dense deployment of base station systems may often operate less than optimally, thereby failing to fully exploit the capacity of the individual base stations. Nevertheless, it is expected that the density of base station deployment will continue to grow in an effort to satisfy the increasing demand for wireless communications, particularly high data rate wireless communications.

SUMMARY

In one aspect of the disclosure, a method of wireless communication comprises monitoring, by a cell, wireless communications, wherein the cell is operable in a plurality of cell operational states, and wherein the monitoring is performed in at least two cell operational states of the plurality of cell operational states. The method also comprises controlling transition of operation of the cell between a current cell operational state of the plurality of cell operational states and a next cell operational state of the plurality of cell operational states based upon the monitoring.

In an additional aspect of the disclosure, an apparatus configured for wireless communication comprises means for monitoring, by a cell, wireless communications, wherein the cell is operable in a plurality of cell operational states, and wherein the monitoring is performed in at least two cell operational states of the plurality of cell operational states. The apparatus also comprises means for controlling transition of operation of the cell between a current cell operational state of the plurality of cell operational states and a next cell operational state of the plurality of cell operational states based upon the monitoring.

In an additional aspect of the disclosure, a computer program product has a computer-readable medium having program code recorded thereon. This program code includes code to monitor, by a cell, wireless communications, wherein the cell is operable in a plurality of cell operational states, and wherein the monitoring is performed in at least two cell operational states of the plurality of cell operational states. The program code also includes code to control transition of operation of the cell between a current cell operational state of the plurality of cell operational states and a next cell operational state of the plurality of cell operational states based upon the monitoring.

In an additional aspect of the disclosure, an apparatus includes at least one processor and a memory coupled to the processor. The processor is configured to monitor, by a cell, wireless communications, wherein the cell is operable in a plurality of cell operational states, and wherein the monitoring is performed in at least two cell operational states of the plurality of cell operational states. The processor is also configured to control transition of operation of the cell between a current cell operational state of the plurality of cell operational states and a next cell operational state of the plurality of cell operational states based upon the monitoring.

In one aspect of the disclosure, a method of wireless communication comprises controlling transition of operation of a cell between a plurality of cell operational states, wherein the plurality of operational states include a dormant state and an active state. The method also comprises providing, when the cell is operable in the dormant state, periodic low duty cycle (LDC) transmission by the cell in a downlink, wherein the periodic LDC transmission is the only downlink transmission by the cell when operable in the dormant state.

In an additional aspect of the disclosure, an apparatus configured for wireless communication comprises means for controlling transition of operation of a cell between a plurality of cell operational states, wherein the plurality of operational states include a dormant state and an active state. The apparatus also comprises means for providing, when the cell is operable in the dormant state, periodic low duty cycle (LDC) transmission by the cell in a downlink, wherein the periodic LDC transmission is the only downlink transmission by the cell when operable in the dormant state.

In an additional aspect of the disclosure, a computer program product has a computer-readable medium having program code recorded thereon. This program code includes code to control transition of operation of a cell between a plurality of cell operational states, wherein the plurality of operational states include a dormant state and an active state. The program code also include code to provide, when the cell is operable in the dormant state, periodic low duty cycle (LDC) transmission by the cell in a downlink, wherein the periodic LDC transmission is the only downlink transmission by the cell when operable in the dormant state.

In an additional aspect of the disclosure, an apparatus includes at least one processor and a memory coupled to the processor. The processor is configured to control transition of operation of a cell between a plurality of cell operational states, wherein the plurality of operational states include a dormant state and an active state. The processor is also configured to provide, when the cell is operable in the dormant state, periodic low duty cycle (LDC) transmission by the cell in a downlink, wherein the periodic LDC transmission is the only downlink transmission by the cell when operable in the dormant state.

In one aspect of the disclosure, a method of wireless communication comprises receiving, by a user equipment (UE) from an active cell serving the UE, information regarding an enhanced cell operable in at least two cell operational states. The method also comprises monitoring, by the UE using the received information, downlink transmission of the enhanced cell during a period in which the UE is not being served by the enhanced cell.

In an additional aspect of the disclosure, an apparatus configured for wireless communication comprises means for receiving, by a user equipment (UE) from an active cell serving the UE, information regarding an enhanced cell operable in at least two cell operational states. The apparatus also comprises means for monitoring, by the UE using the received information, downlink transmission of the enhanced cell during a period in which the UE is not being served by the enhanced cell.

In an additional aspect of the disclosure, a computer program product has a computer-readable medium having program code recorded thereon. This program code includes code to receive, by a user equipment (UE) from an active cell serving the UE, information regarding an enhanced cell operable in at least two cell operational states. The program code also includes code to monitor, by the UE using the received information, downlink transmission of the enhanced cell during a period in which the UE is not being served by the enhanced cell.

In an additional aspect of the disclosure, an apparatus includes at least one processor and a memory coupled to the processor. The processor is configured to receive, by a user equipment (UE) from an active cell serving the UE, information regarding an enhanced cell operable in at least two cell operational states. The processor is also configured to monitor, by the UE using the received information, downlink transmission of the enhanced cell during a period in which the UE is not being served by the enhanced cell.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
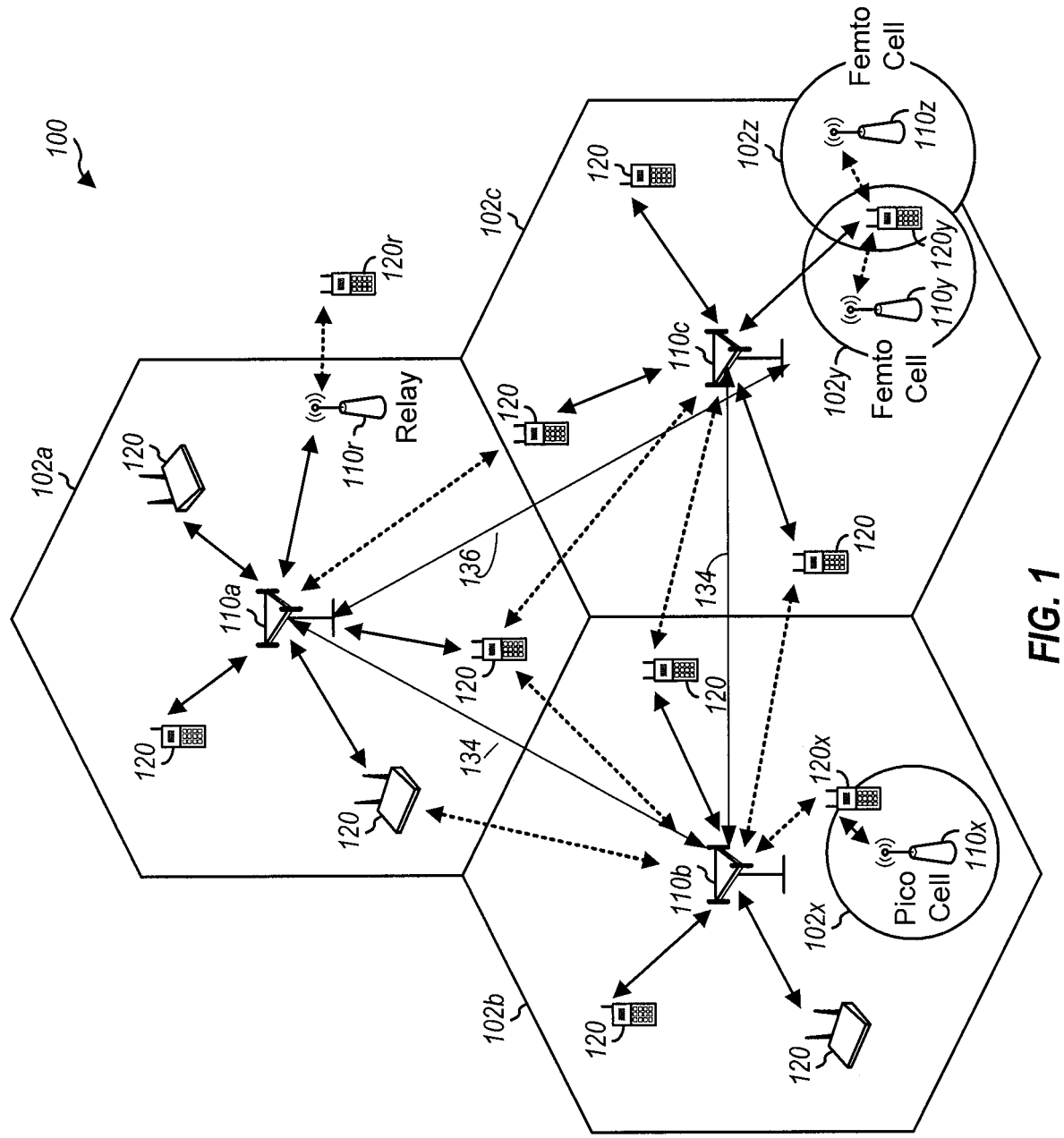
FIG. 1 is a block diagram conceptually illustrating an example of a mobile communication system.

FIG. 1 shows wireless network 100 for communication, which may be an LTE-A network. Wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, eNBs 110a, 110b and 110c are macro eNBs for macro cells 102a, 102b and 102c, respectively. eNB 110x is a pico eNB for pico cell 102x. And, eNBs 110y and 110z are femto eNBs for femto cells 102y and 102z, respectively. An eNB may support one or multiple (e.g., two, three, four, and the like) cells.

Wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, relay station 110r may communicate with eNB 110a and UE 120r, in which relay station 110r acts as a relay between the two network elements (eNB 110a and UE 120r) in order to facilitate communication between them. A relay station may also be referred to as a relay eNB, a relay, and the like.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

UEs 120 are dispersed throughout wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.4, 3, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10 or 20 MHz, respectively.

Figure 2:
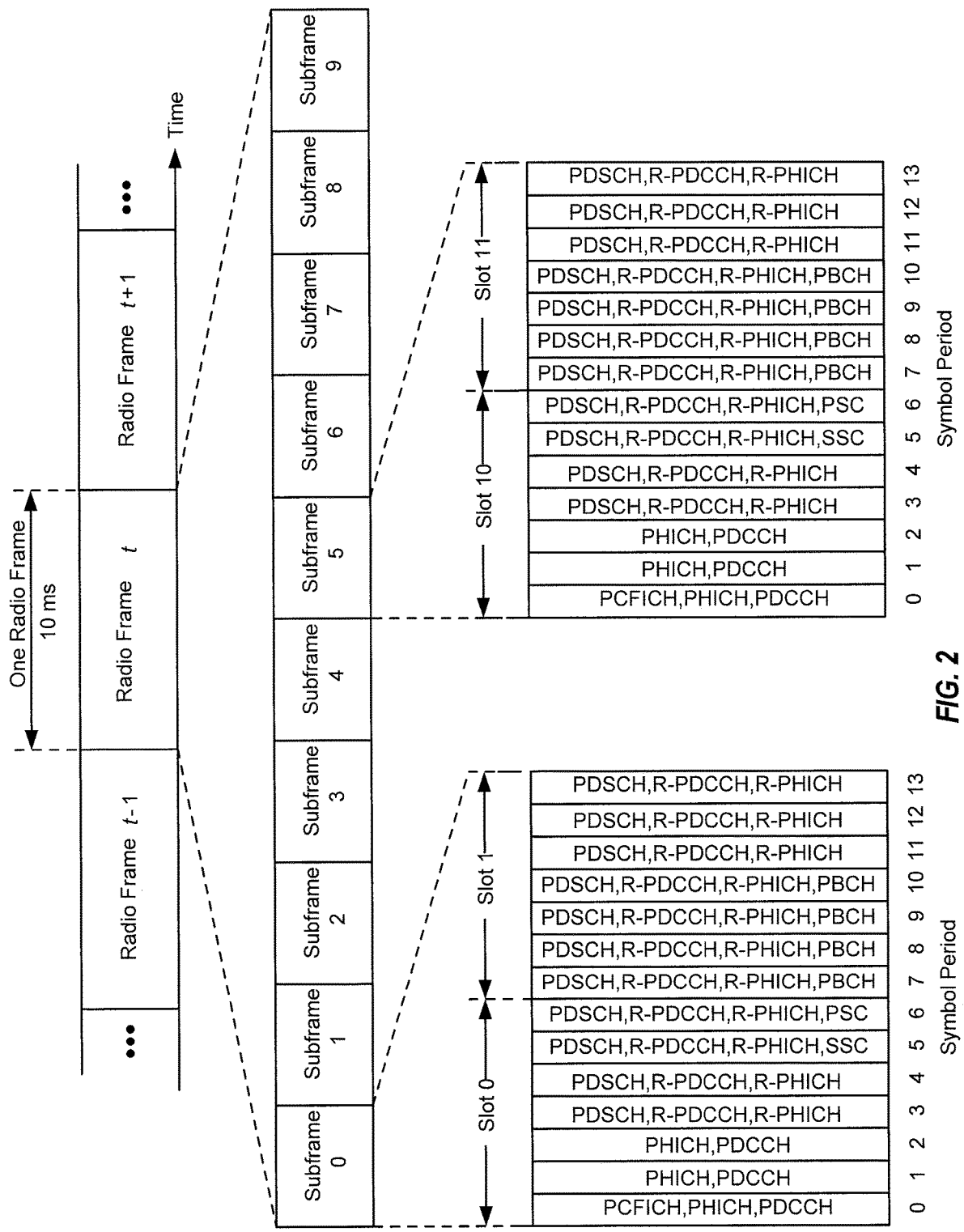
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc. With the UE being within the coverage of the multiple eNBs, the transmissions by or to the non-selected eNBs may, however, cause interference and sub-optimal performance with respect to the communications between the UE and the selected eNB, particularly in hyperdense network deployments (e.g., where a very large number (possibly hundreds) of small cells (pico cells, remote radio heads (RRHs), femto cells, relays, etc.) are deployed per a typical macro cell area). Accordingly, as described in detail below, embodiments herein implement an enhanced new carrier type (eNCT) operable to adapt the cells for opportunistic behavior that adapts to the geo-temporal traffic distribution and transmit downlink common channels only when needed. For example, base stations implementing eNCT techniques herein may transition between two or more operational states, such as an active state wherein full base station functionality is performed and a dormant state wherein limited base station functionality is performed, based upon geo-temporal traffic distribution within the network. Thus, when a base station is not actively serving a UE, the downlink transmission by the base station, and resulting interference, may be reduced or even eliminated. It should be appreciated that in a wireless network having a relatively dense deployment of base stations, areas which would otherwise be served by a dormant base station are likely to nevertheless have wireless communication coverage provided by a base station which remains active. Moreover, as will be appreciated from the details which follow, even dormant base stations may be utilized to facilitate initial connected state operation of UEs in proximity to the base station by transitioning to an active state.

Figure 3:
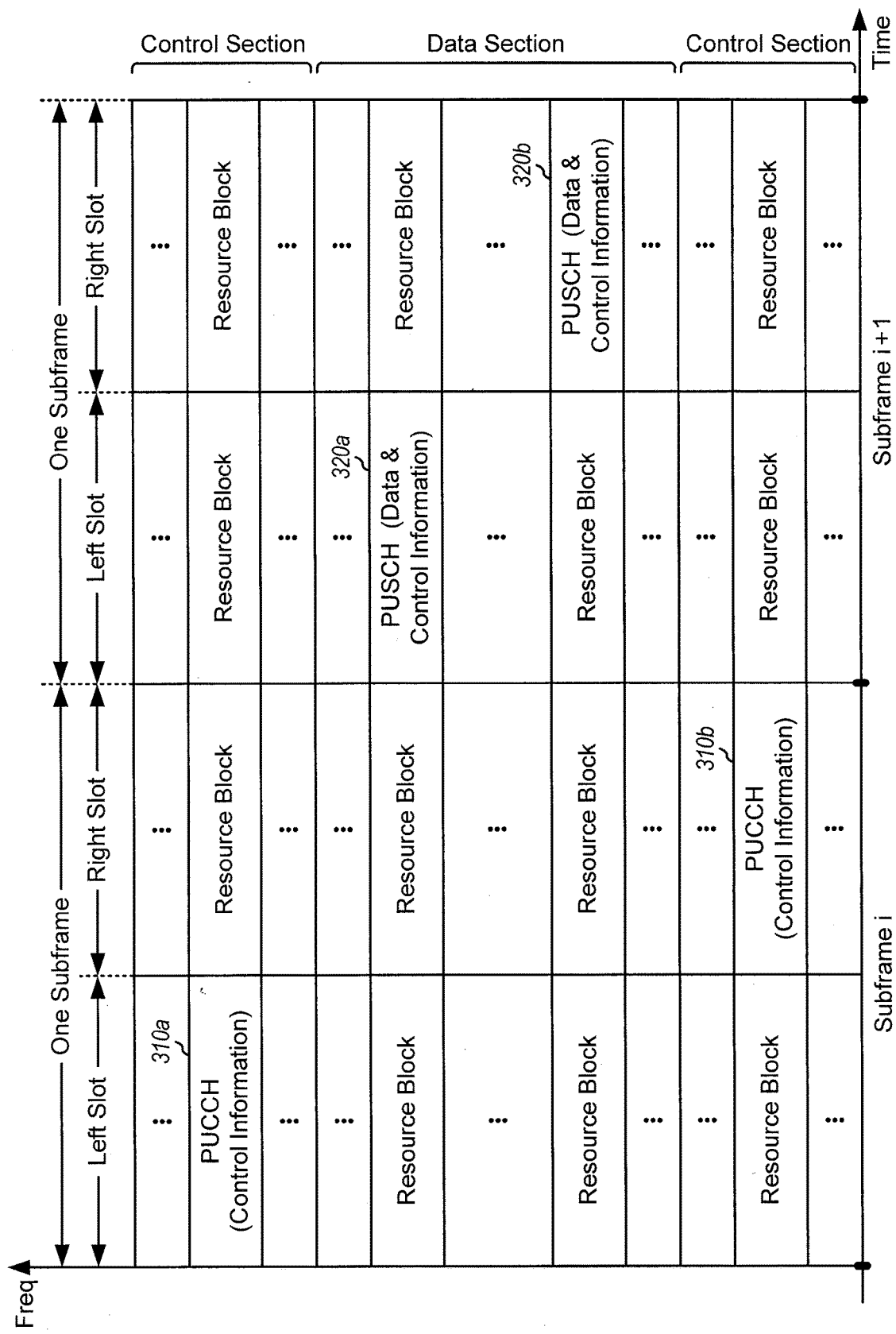
FIG. 3 is a block diagram conceptually illustrating an exemplary frame structure in uplink LTE/-A communications.

FIG. 3 is a block diagram illustrating exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on assigned resource blocks 310a and 310b in the control section. The UE may transmit only data or both data and control information in a Physical Uplink Shared Channel (PUSCH) on assigned resource blocks 320a and 320b in the data section. An uplink transmission may span both slots of a subframe and may hop across frequency as shown in FIG. 3.

Referring back to FIG. 1, wireless network 100 uses the diverse set of eNBs 110 (i.e., macro eNBs, pico eNBs, femto eNBs, and relays) to improve the spectral efficiency of the system per unit area. Because wireless network 100 uses such different eNBs for its spectral coverage, it may also be referred to as a heterogeneous network. Macro eNBs 110a-c are usually carefully planned and placed by the provider of wireless network 100. Macro eNBs 110a-c generally transmit at high power levels (e.g., 5 W-40 W). Pico eNB 110x and relay station 110r, which generally transmit at substantially lower power levels (e.g., 100 mW-2 W), may be deployed in a relatively unplanned manner to eliminate coverage holes in the coverage area provided by macro eNBs 110a-c and improve capacity in the hot spots. Femto eNBs 110y-z, which are typically deployed independently from wireless network 100 may, nonetheless, be incorporated into the coverage area of wireless network 100 either as a potential access point to wireless network 100, if authorized by their administrator(s), or at least as an active and aware eNB that may communicate with other eNBs 110 of wireless network 100 to perform resource coordination and coordination of interference management. Femto eNBs 110y-z typically also transmit at substantially lower power levels (e.g., 100 mW-2 W) than macro eNBs 110a-c.

In operation of a heterogeneous network, such as wireless network 100, each UE is usually served by the eNB of wireless network 100 with the better signal quality, while the unwanted signals received from the other eNBs are treated as interference. While such operational principals can lead to significantly sub-optimal performance, gains in network performance are realized in wireless network 100 by using intelligent resource coordination among eNBs 110, better server selection strategies, and more advanced techniques for efficient interference management.

A pico eNB, such as pico eNB 110x, is characterized by a substantially lower transmit power when compared with a macro eNB, such as macro eNBs 110a-c. A pico eNB will also usually be placed around a network, such as wireless network 100, in an ad hoc manner. Because of this unplanned deployment, wireless networks with pico eNB placements, such as wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of macro eNBs 110a-c and pico eNB 110x implies that, in a mixed deployment, the downlink coverage area of pico eNB 110x will be much smaller than that of macro eNBs 110a-c.

In the uplink case, however, the signal strength of the uplink signal is governed by the UE, and, thus, will be similar when received by any type of eNBs 110. With the uplink coverage areas for eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as wireless network 100, will be greatly diminished. This is because the larger coverage area of the higher powered macro eNBs, such as macro eNBs 110a-c, limits the benefits of splitting the cell coverage with the pico eNBs, such as pico eNB 110x, because, the higher downlink received signal strength of macro eNBs 110a-c will attract all of the available UEs, while pico eNB 110x may not be serving any UE because of its much weaker downlink transmission power. Moreover, macro eNBs 110a-c will likely not have sufficient resources to efficiently serve those UEs. Therefore, wireless network 100 will attempt to actively balance the load between macro eNBs 110a-c and pico eNB 110x by expanding the coverage area of pico eNB 110x. This concept is referred to as cell range extension (CRE).

Wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, wireless network 100 provides a fixed partitioning of resources between macro eNBs 110a-c and pico eNB 110x. However, even with this active balancing of load, downlink interference from macro eNBs 110a-c should be mitigated for the UEs served by the pico eNBs, such as pico eNB 110x. This can be accomplished by various methods, including interference cancellation at the UE, resource coordination among eNBs 110, or the like.

In a heterogeneous network with cell range extension, such as wireless network 100, in order for UEs to obtain service from the lower-powered eNBs, such as pico eNB 110x, in the presence of the stronger downlink signals transmitted from the higher-powered eNBs, such as macro eNBs 110a-c, pico eNB 110x engages in control channel and data channel interference coordination with the dominant interfering ones of macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 4:
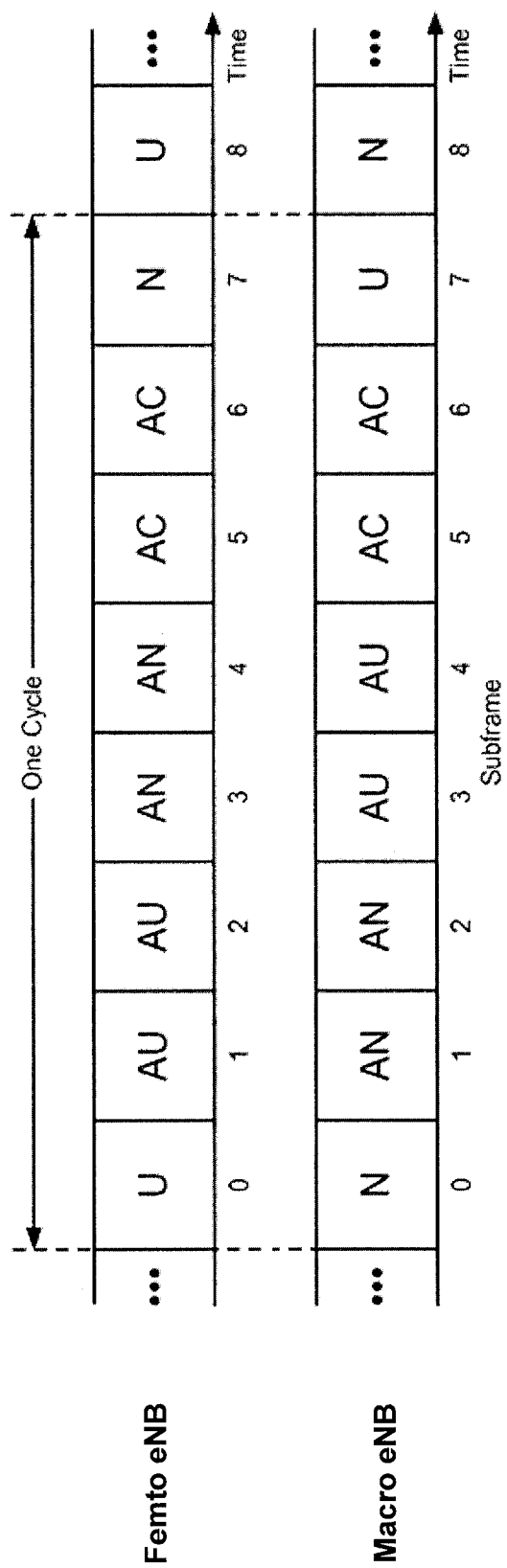
FIG. 4 is a block diagram conceptually illustrating time division multiplexed (TDM) partitioning in a heterogeneous network according to one aspect of the disclosure.

FIG. 4 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for extended boundary area (EBA) UEs strongly affected by aggressor eNBs. An EBA UE may belong to a first eNB but also be located in the coverage area of a second eNB. For example, a UE communicating with a macro eNB that is near the range limit of a femto eNB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities. This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as wireless network 100, a UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c (as shown in FIG. 1) or to femto eNB 110z also with lower received power (not shown in FIG. 1). UE 120y may then observe high interference from femto eNB 110y on the downlink and may also cause high interference to eNB 110y on the uplink. Using coordinated interference management, eNB 110c and femto eNB 110y may communicate over backhaul 134 to negotiate resources. In the negotiation, femto eNB 110y agrees to cease transmission on one of its channel resources, such that UE 120y will not experience as much interference from femto eNB 110y as it communicates with eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 μs (5 km÷3×108, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 5:
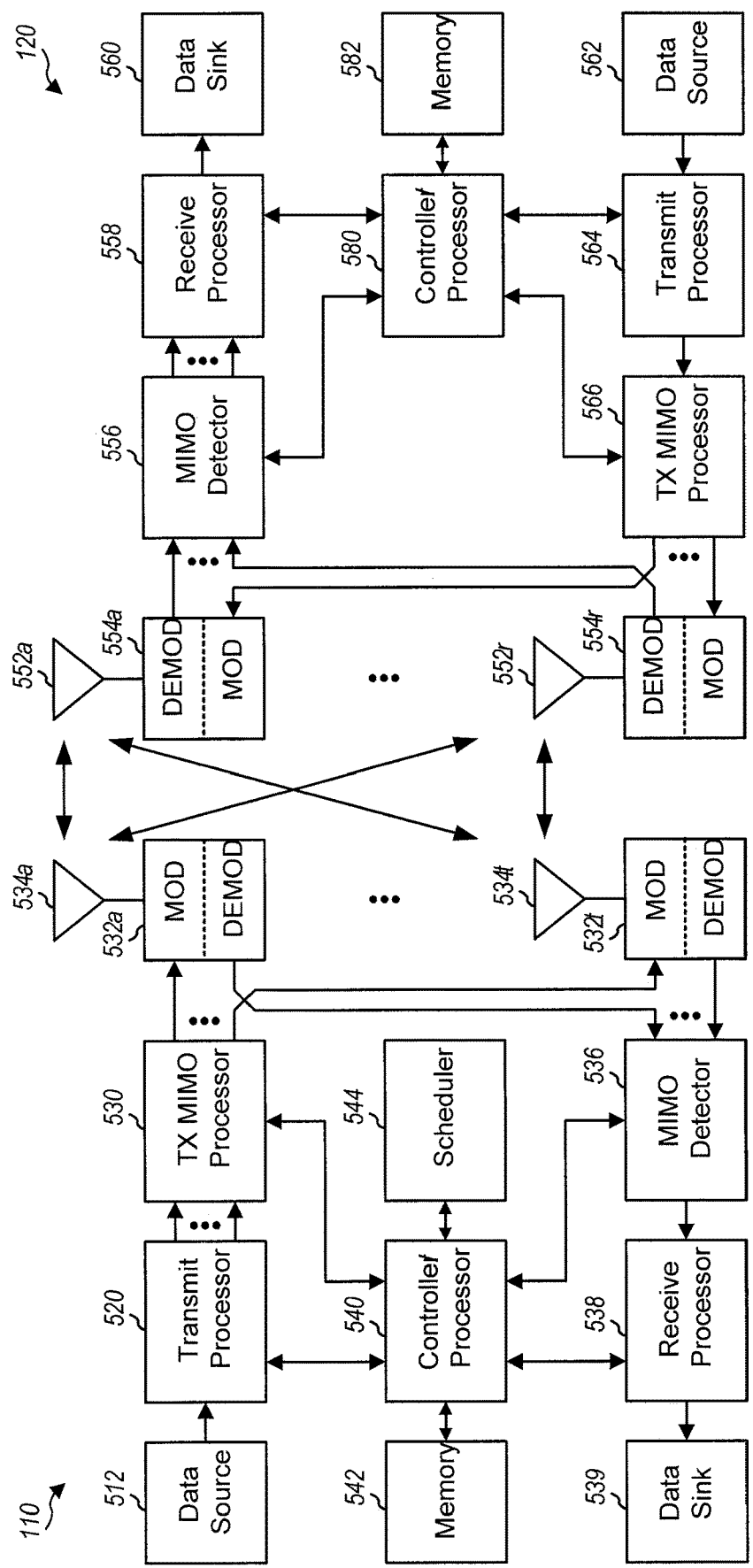
FIG. 5 is a block diagram conceptually illustrating a design of a base station/eNB and a UE configured according to one aspect of the present disclosure.

FIG. 5 shows a block diagram of a design of base station/eNB 110 and UE 120, which may be one of the base stations/eNBs and one of the UEs in FIG. 1. For a restricted association scenario, eNB 110 may be macro eNB 110c in FIG. 1, and UE 120 may be UE 120y. eNB 110 may also be a base station of some other type. eNB 110 may be equipped with antennas 534a through 534t, and UE 120 may be equipped with antennas 552a through 552r.

At eNB 110, transmit processor 520 may receive data from data source 512 and control information from controller/processor 540. The control information may be for the PBCH, PCFICH, PHICH, PDCCH, etc. The data may be for the PDSCH, etc. Transmit processor 520 may process (e.g., encode and symbol map) the data and control information to obtain data symbols and control symbols, respectively. Transmit processor 520 may also generate reference symbols, e.g., for the PSS, SSS, and cell-specific reference signal. Transmit (TX) multiple-input multiple-output (MIMO) processor 530 may perform spatial processing (e.g., precoding) on the data symbols, the control symbols, and/or the reference symbols, if applicable, and may provide output symbol streams to modulators (MODs) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via antennas 534a through 534t, respectively.

At UE 120, antennas 552a through 552r may receive the downlink signals from eNB 110 and may provide received signals to demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. MIMO detector 556 may obtain received symbols from all demodulators 554a through 554r, perform MIMO detection on the received symbols if applicable, and provide detected symbols. Receive processor 558 may process (e.g., demodulate, deinterleave, and decode) the detected symbols, provide decoded data for UE 120 to data sink 560, and provide decoded control information to controller/processor 580.

On the uplink, at UE 120, transmit processor 564 may receive and process data (e.g., for the PUSCH) from data source 562 and control information (e.g., for the PUCCH) from controller/processor 580. Transmit processor 564 may also generate reference symbols for a reference signal. The symbols from transmit processor 564 may be precoded by TX MIMO processor 566 if applicable, further processed by demodulators 554a through 554r (e.g., for SC-FDM, etc.), and transmitted to eNB 110. At eNB 110, the uplink signals from UE 120 may be received by antennas 534, processed by modulators 532, detected by MIMO detector 536 if applicable, and further processed by receive processor 538 to obtain decoded data and control information sent by UE 120. Processor 538 may provide the decoded data to data sink 539 and the decoded control information to controller/processor 540.

Controllers/processors 540 and 580 may direct the operation at eNB 110 and UE 120, respectively. Controller/processor 540 and/or other processors and modules at eNB 110 may perform or direct the execution of various processes for the techniques described herein, including execution of the functional blocks illustrated in FIGS. 9 and 13A-C. Controllers/processor 580 and/or other processors and modules at UE 120 may also perform or direct the execution of various processes for the techniques described herein. Memories 542 and 582 may store data and program codes for eNB 110 and UE 120, respectively. Scheduler 544 may schedule UEs for data transmission on the downlink and/or uplink.

Embodiments herein implement eNCT techniques to adapt the cells, and possibly correspondingly the UEs, for opportunistic behavior to provide an energy efficient infrastructure, facilitate network densification, and optimize spectrum sharing. Accordingly, eNB 110 and/or UE 120 of FIG. 5 are adapted for eNCT operation in accordance with the concepts herein. For example, controller/processor 540 of eNB 110 may be provided with an instruction set (e.g., program code) defining base station system operation as described herein. Correspondingly, controller/processor 580 of UE 120 may be provided with an instruction set (e.g., program code) defining UE system operation as described herein.

Figure 6:
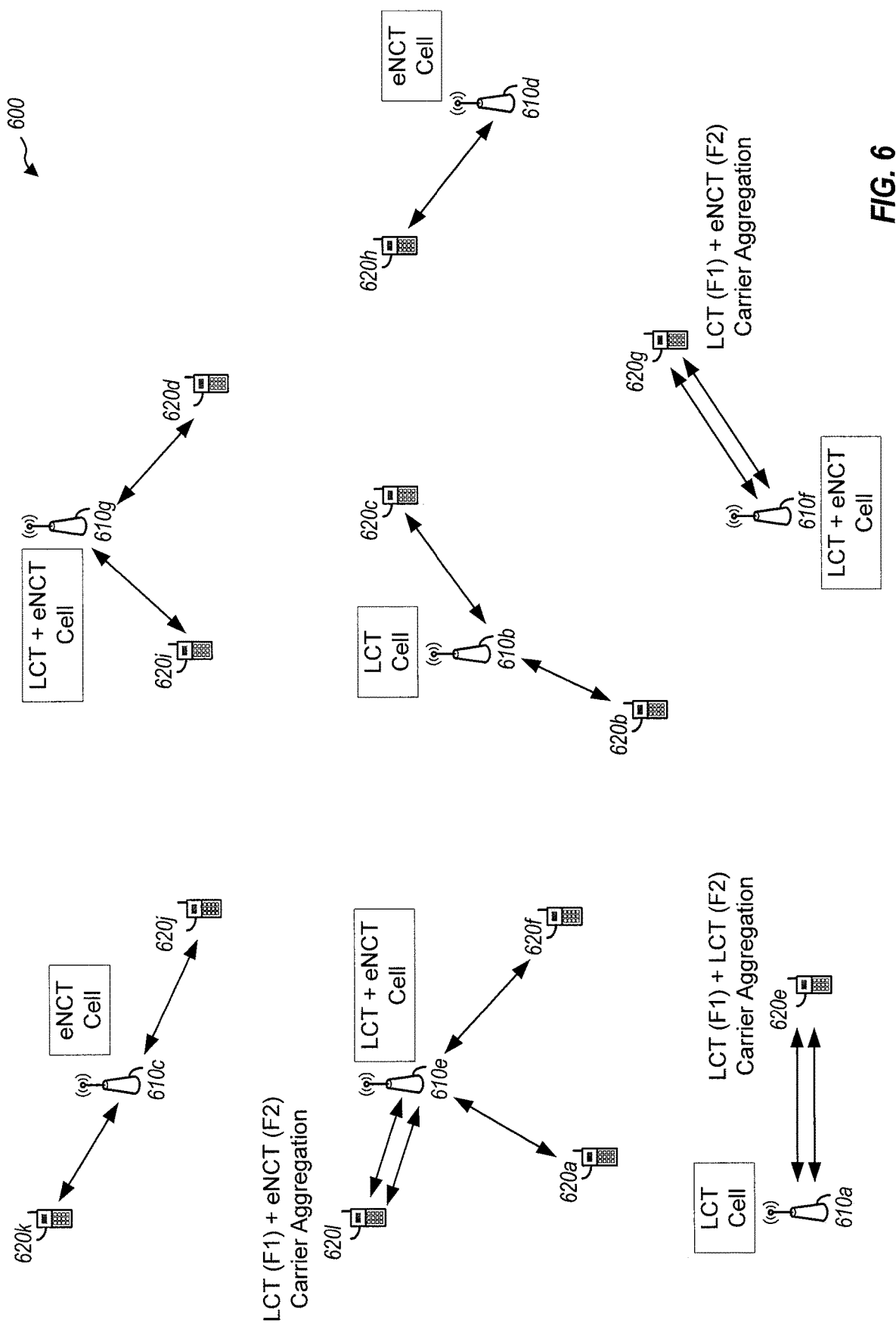
FIG. 6 is a block diagram conceptually illustrating an example of a wireless network implementing enhanced new carrier type techniques according to the concepts herein.

It should be appreciated that in some instances, LTE infrastructure may be intended primarily for capacity and not coverage. According to LTE infrastructure deployment models, a large number of cells (e.g., pico cells) may be deployed in capacity limited areas to fulfill the demand for wireless communications. In a hyperdense deployment, a very large number of such cells may be deployed within a wireless communication service area. Although having the potential to provide significant capacity, such deployment of cells in relatively close proximity leads to increasing energy consumption and common channel interference. Implementation of eNCT techniques herein with respect to such LTE infrastructure, particularly infrastructure forming a hyperdense deployment, may be used to address these operational challenges. In particular, eNCT techniques implemented according to embodiments herein provide opportunistic small cells that adapt to the geo-temporal traffic distribution in order to minimize interference in a partially loaded network, maximize capacity, maximize infrastructure energy efficiency, and/or facilitate efficient UE state transitions.

eNCT techniques herein may be implemented with respect to a plurality of cell types, as illustrated in FIG. 6 showing an embodiment of wireless network 100 implementing eNCT techniques according to the concepts herein. The particular eNCT operation provided may be specifically adapted to facilitate operation with respect to a cell type of the plurality of cell types.

One type of cell for which eNCT techniques may be implemented according to embodiments herein is a legacy carrier type (LCT) cell, shown as LCT cells 610a and 610b. LCT cells herein may provide operation (e.g., implement communication protocols, signaling, etc.) supported by legacy UEs (i.e., UEs which have not been specifically adapted for eNCT operation) as well as enhanced UEs (i.e., UEs which have been specifically adapted for eNCT operation). For example, a LTE LCT cell of embodiments may support legacy LTE devices (e.g., ≤LTE Rel. 11) as well as newly developed LTE devices (e.g., ≥LTE Rel. 12). Accordingly, eNCT operation by a LCT cell may be adapted to be transparent to the UEs in order to accommodate legacy UE operation.

Another type of cell for which eNCT techniques may be implemented according to embodiments herein is an eNCT cell, shown as eNCT cells 610c and 610d. eNCT cells may provide operation (e.g., implement communication protocols, signaling, etc.) supported only by enhanced UEs. For example, a LTE eNCT cell may support newly developed LTE devices (e.g., ≥LTE Rel. 12). Accordingly, eNCT operation by an eNCT cell may be adapted to optimize the eNCT implementation because the UEs supported thereby are correspondingly adapted for eNCT operation.

Cells of a wireless network, such as wireless network 100, may additionally or alternatively provide a combined or multi-type cell configuration. For example, the foregoing LCT cell and eNCT cell types may be collocated in the same node, as shown by LCT+eNCT cells 610e-610g. Such a multi-type cell may transition to LCT cell type operation or eNCT cell type operation depending upon the configuration of UEs being served. For example, a LCT+eNCT cell may receive information (e.g., via a backhaul link) regarding the capabilities of UEs from neighboring cells serving the UEs to determine the presence of legacy or enhanced UEs and thus determine whether to enter a LCT cell or eNCT cell active state mode. Additionally or alternatively, a LCT+eNCT cell may utilize a beacon or other signal transmitted by enhanced UEs operable in accordance with eNCT techniques herein to determine the presence of enhanced UEs and thus determine whether to enter a LCT cell or eNCT cell active state mode.

As can be appreciated from the foregoing, eNCT techniques herein may be implemented with respect to a plurality of UE types. In particular, eNCT techniques may be implemented for legacy UEs (i.e., UEs which have not been specifically adapted for eNCT operation) and/or enhanced UEs (i.e., UEs which have been specifically adapted for eNCT operation). For example, in the embodiment illustrated in FIG. 6, eNCT operation is adapted to support legacy LTE UEs (e.g., LTE Rel. 8/9 and Rel. 10/11 UEs by LCT cells 610a and 610b and LCT+eNCT cells 610e-610g), shown as UEs 620a-620d, and enhanced LTE UEs (e.g., new UEs capable of legacy operation and eNCT operation, also referred to herein as LTE Rel. 12 UEs, by eNCT cells 610c and 610d and LCT+eNCT cells 610e-610g), shown as UEs 620e-620e.

It should be appreciated that the base stations of the embodiment illustrated in FIG. 6 (i.e., LCT cells 610a and 610b, eNCT cells 610c and 610d, and LCT+eNCT cells 610e-610g) may correspond to any of the base stations of wireless network 100 shown in FIG. 1, and thus may be configured as shown by base station 110 of FIG. 5 and provided with an instruction set (e.g., program code) defining base station system operation as described herein. Similarly, the UEs of the embodiment illustrated in FIG. 6 (i.e., legacy UEs 620a-620d and enhanced UEs 620e-620e) may correspond to any of the UEs of wireless network 100, and thus may be configured as shown by UE 120 of FIG. 5 and provided with an instruction set (e.g., program code) defining UE system operation as described herein.

As shown in the embodiment illustrated in FIG. 6, the different base station types may use the same carrier frequencies across the cells (e.g., LCT cells and eNCT cells may utilize common carrier frequencies for their communication with respective UEs). Moreover, techniques for providing increased capacity with respect to particular UEs, such as carrier aggregation, may be supported by eNCT techniques herein.

eNCT operation according to the concepts herein provides for multiple operational cell states that adapt operation of the cells to the geo-temporal traffic distribution in order to minimize interference in a partially loaded network, maximize capacity, maximize infrastructure energy efficiency, and/or facilitate efficient UE state transitions. For example, in addition to an off state and an operational active state, eNCT operation of embodiments includes an operational dormant state. That is, cells adapted for implementation of eNCT techniques according to embodiments herein, whether LCT cells, eNCT cells, or LCT+eNCT cells, provide a plurality of different operational states (e.g., a dormant state and an active state), wherein the cell is operable to monitor communications associated with UEs in at least two of the different operational states. It should be appreciated that eNCT operation according to embodiments provides for the base station operating in the dormant state for extended periods of time (e.g., on the order of minutes, hours, days, etc.), as appropriate in response to the geo-temporal traffic distribution within the network.

In the off state, a cell (e.g., LCT cell, eNCT cell, or LCT+eNCT cell) is incapable of detecting a UE and the cell cannot be detected by a UE). In the dormant state provided by eNCT techniques of embodiments, a cell (e.g., LCT cell, eNCT cell, or LCT+eNCT cell) can detect UEs although the cell cannot serve connected state UEs. Moreover, some dormant state cells (e.g., eNCT cells and LCT+eNCT cells) may be detected by UEs (e.g., enhanced UEs). In the active state, cells can serve appropriately configured UEs (e.g., LCT cells and LCT+eNCT cells may serve legacy UEs and enhanced UEs and eNCT cells may serve enhanced UEs).

Figure 7A:
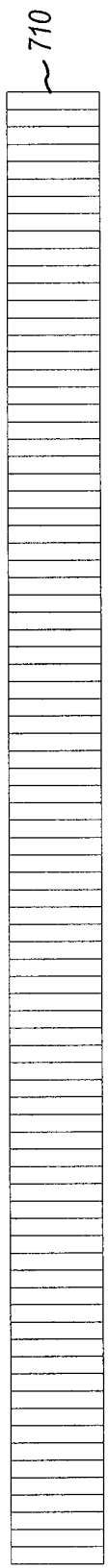
FIGS. 7A-7C are block diagrams conceptually illustrating downlink transmission and uplink reception by an exemplary legacy carrier type cell implementing enhanced new carrier type techniques in different states according to the concepts herein.
Figure 7B:
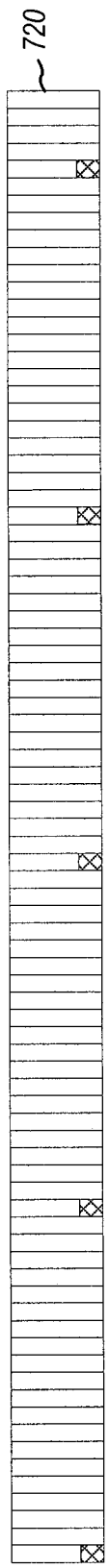
Figure 7C:

FIGS. 7A-7C illustrate the downlink transmission and uplink reception by a cell (e.g., LCT cell or LCT+eNCT cell operable in LCT mode) in accordance with techniques herein in the aforementioned off, dormant, and active states respectively.

As illustrated in uplink/downlink frame structure 710 of FIG. 7A, there is no transmission by the cell in the downlink and no reception by the cell in the uplink when in the off state (i.e., the cell is not operational or "off"). Accordingly, the cells in the off state remain unaware of UEs and the UEs are unable to discover these cells.

As illustrated in uplink/downlink frame structure 720 of FIG. 7B, although there is no transmission by the cell in the downlink, there is sparse reception by the cell when operating in the dormant state. For example, the LCT or LCT+eNCT cell operating in a dormant state in accordance with the techniques herein may provide periodic reception of signals associated with UEs operating in a connected state with neighboring serving cells. It should be appreciated that, in such embodiments, the transmission of signals associated with the UE being monitored by the dormant state cell is governed by the serving cell rules rather than being governed by the cell operating in the dormant state. The particular UE signals that may be monitored by the dormant state cell may comprise random access channel (RACH) preamble (PRACH) triggered by the serving cell, PDCCH, periodic or aperiodic sounding reference signal (SRS), periodic PUCCH, etc. as well as combinations thereof. For example, UEs may transmit specific reserved PRACH signatures, wherein such PRACH signatures may be utilized by dormant state LCT cells to identify UEs served by neighboring cells. The signal characteristics for such signals may be conveyed by neighbor cell to the dormant cells (e.g., using a backhaul link), through static operations, administration, and management (OA&M) provisioning, etc. to facilitate monitoring of the UEs by the dormant state cells.

LCT and LCT+eNCT cells operating in a dormant state in accordance with techniques herein may monitor aspects of the communication channel in addition to or in the alternative to the aforementioned signals associated with connected state UEs. For example, a dormant state LCT cell may provide periodic interference-over-thermal (IOT) measurements for use in detecting UEs (e.g., inferring the presence of UEs) within a service area of the dormant cell.

It can be appreciated from the foregoing that, for LCT cells operating in a dormant state in accordance with eNCT techniques of embodiments, the dormant state cell cannot be detected by UEs, due to no downlink transmission by the dormant state cell, and thus the UEs are unaware of these dormant cells. However, the dormant state LCT cells can detect UEs in a connected state with neighboring cells, such as based upon uplink signals and/or IOT measurements.

LCT and LCT+eNCT cells operating in an active state in accordance with techniques herein provide communication in accordance with legacy operation, as illustrated in uplink/downlink frame structure 730 of FIG. 7C. For example, the cell may provide common signaling in the downlink, such as may include PSS and SSS in every fifth subframe, PBCH in every tenth subframe, system information block 1 (SIB1) in every twentieth subframe, common reference signal (RS) in all subframes, etc.

Figure 8:
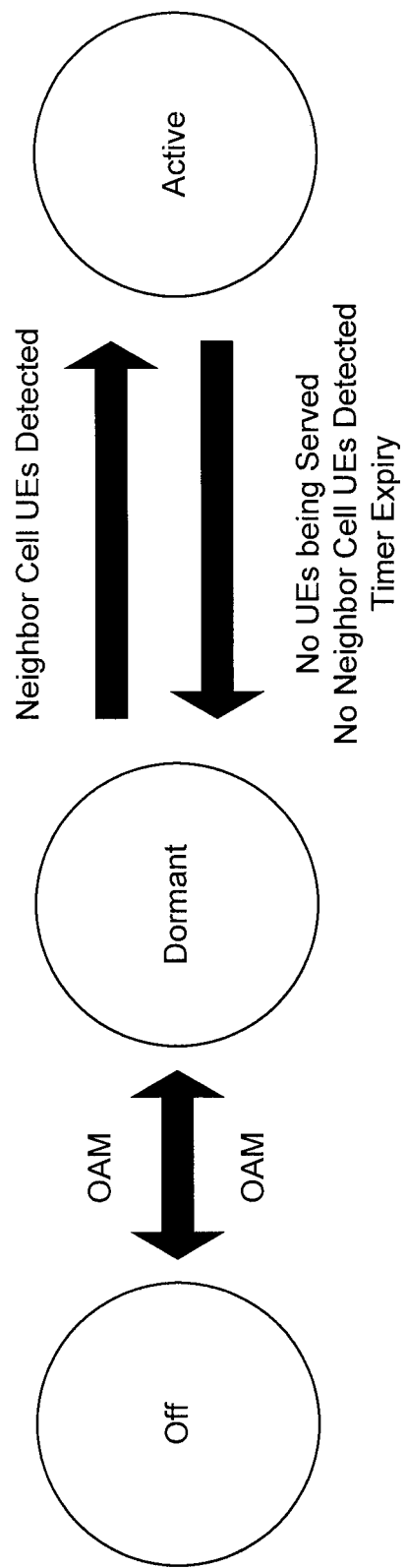
FIG. 8 is a state transition diagram illustrating state transitions by an exemplary legacy carrier type cell implementing enhanced new carrier type techniques according to the concepts herein.

As shown in the state transition diagram of FIG. 8, LCT cells operating in accordance with eNCT techniques (e.g., LCT cells and LCT+eNCT cells) may transition between the foregoing states as appropriate. For example, a LCT cell may transition between the off state and the dormant state in accordance with OA&M control. The LCT cell may transition from the dormant state to the active state in accordance with its monitoring of UEs (e.g., upon detection of a UE being served by a neighboring cell, upon IOT measurements indicative of operation of a nearby connected state UE, etc.), such as when a monitored aspect of the UE indicates the UE may be efficiently and/or effectively served by the previously dormant cell. Once in the active state, the LCT cell of embodiments provides normal legacy cell operation (e.g., LTE Rel. 8/9/10/11 operation). The LCT cell may transition from the active state to the dormant state in accordance with its monitoring of UEs (e.g., upon detecting no UEs being served by the LCT cell, upon detecting no UEs in a connected state with a neighboring cell, etc.), such as when a threshold amount of time expires without a monitored aspect of the UE indicating the UE may be served by the previously active cell.

Figure 9:
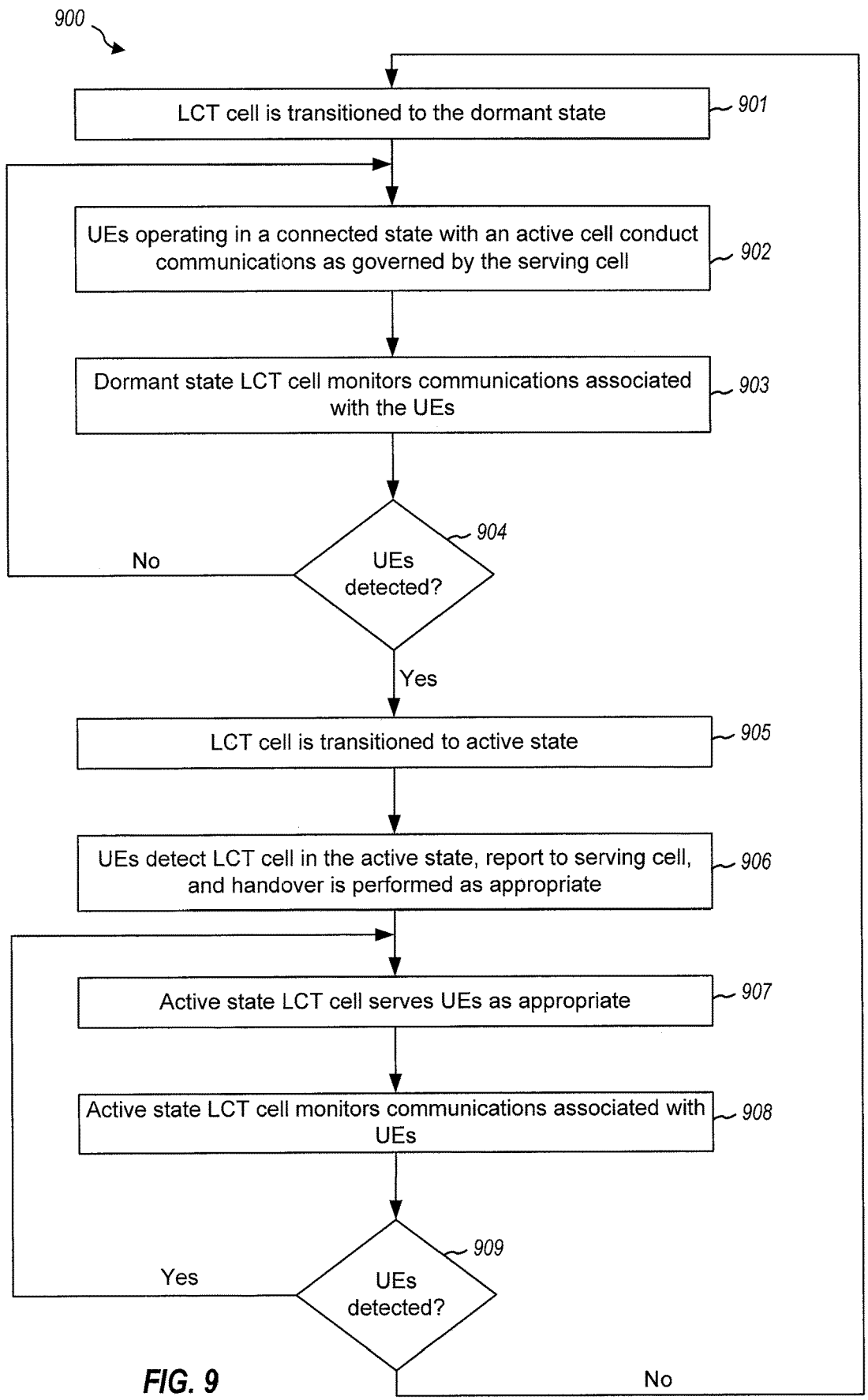
FIG. 9 is a block diagram showing an exemplary operational flow of a legacy carrier type cell implementing enhanced new carrier type techniques according to the concepts herein.

Flow 900 of FIG. 9 shows operation of a cell (e.g., LCT cell 610a of FIG. 6) in accordance with techniques implemented according to embodiments herein. At block 901 of the illustrated embodiment, the LCT cell is transitioned to the dormant state. For example, OA&M control may transition the LCT cell from an off state to the dormant state. Alternatively, the LCT cell may have transitioned to the dormant state from an active state, as will be described below. It should be appreciated that such a dormant state may be a default operational state for one or more LCT cells of a wireless communication network, such as to minimize or otherwise reduce the number of cells providing common channel downlink transmission during times of low network activity.

At block 902 UEs (e.g., UEs 620a, 620f, and 620e) operating in a connected state with active cells (e.g., LCT+eNCT cell 610e) conduct communications as governed by their serving cell. For example, the UEs may transmit PRACH triggered by the serving cell, receive PDCCH from the serving cell, transmit periodic or aperiodic SRS, transmit periodic PUCCH, etc. In operation according to embodiments herein, UEs are periodically triggered by a serving cell to transmit specific reserved PRACH signatures, wherein such PRACH signatures may be utilized by cells operating in a dormant state to identify UEs served by neighboring cells. The UE transmit power for such transmissions may be a fixed negative offset with respect to a nominal transmit power that would correspond to serving cell open loop pathloss.

At block 903 the dormant state LCT cell (e.g., LCT cell 610a) monitors communications associated with UEs within an area of reception by the LCT cell (e.g., UE 620a being served by neighboring LCT+eNCT cell 610e, assuming in this example that UE 620e is currently not actively operating). For example, LCT cell 610a may detect the aforementioned PRACH signature when transmitted by UE 620a and thus recognize the presence of the neighboring cell UE.

A determination is made by the dormant state LCT cell as to whether UEs are detected at block 904. For example, LCT cell 610a may determine whether any instance of the reserved PRACH signature has been received so as to indicate that the UE may be efficiently and/or effectively served by LCT cell 610a. If it is determined that no such UE has been detected by the dormant state LCT cell, processing according to the illustrated embodiment returns to block 902 for continued service of the UEs by the active cells. However, if it is determined that such a UE has been detected by the dormant state LCT cell, processing according to the illustrated embodiment proceeds to block 905.

At block 905 the dormant state LCT cell is transitioned to the active state. For example, LCT cell 610a may transition from dormant state operation to active state operation as represented in the state transition diagram of FIG. 8. When operating in the active state according to embodiments herein, a LCT cell provides normal legacy cell type operation.

Accordingly, at block 906 the UEs within reception range of the now active state LCT cell may detect the LCT cell in accordance with normal, legacy operation. For example, UE 620a may now detect active state LCT cell 610a. Upon detection of the active state LCT cell, the UE may report certain measurements regarding the LCT cell to the serving cell (e.g., LCT+eNCT cell 610e) and handover between these cells (LCT+eNCT cell 610e and LCT cell 610a) may be performed in accordance with normal procedures (e.g., signal strengths, traffic balancing, etc.). In operation according to embodiments, CRE techniques may be implemented with respect to the handover to cell having transitioned from the dormant state to the active state.

At block 907 the active state LCT cell serves UEs as appropriate. For example, where UE 620a is handed over to LCT cell 610a from LCT+eNCT cell 610e, LCT cell 610a may serve UE 620a in a connected state until handoff is provided in accordance with the network operation or the communication session is terminated.

At block 908 the active state LCT cell monitors UE communications for determining whether the active state is to be maintained. For example, LCT cell 610a may monitor UEs served by the LCT cell to determine when no UEs are being served by the LCT cell (e.g., the UE communication sessions have terminated and/or the UEs have been handed off to other cells). Additionally or alternatively, LCT cell 610a may monitor UEs (e.g., UEs 620a, 620b, and 6200 served by neighboring cells (e.g., LCT cell 610b and LCT+eNCT cell 610e) which are operating within a reception area of LCT cell 610a and determine that none are candidates for service by LCT cell 610a.

A determination is made by the active state LCT cell as to whether UEs are detected at block 909. For example, LCT cell 610a may determine whether any UE is being served by the cell or any instance of the reserved PRACH signature has been received so as to indicate that a UE may be efficiently and/or effectively served by LCT cell 610a. If it is determined that such a UE has been detected by the active state LCT cell, processing according to the illustrated embodiment returns to block 907 for continued operation of the LCT cell in the active state. However, if it is determined that no such UE has been detected by the active state LCT cell for some threshold period of time (e.g., for a few seconds or minutes), processing according to the illustrated embodiment returns to block 901 wherein the active state LCT cell is transitioned to the dormant state.

Figure 10A:
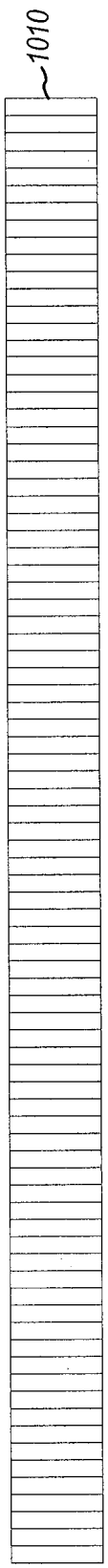
FIGS. 10A-10C are block diagrams conceptually illustrating downlink transmission and uplink reception by an exemplary enhanced new carrier type cell implementing enhanced new carrier type techniques in different states according to the concepts herein.
Figure 10B:
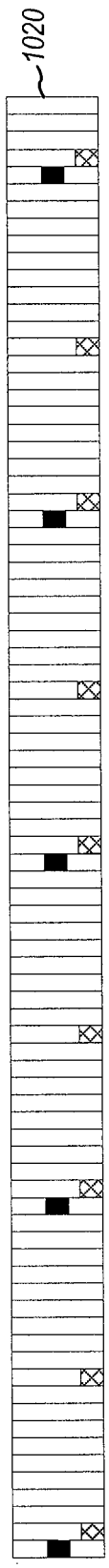
Figure 10C:
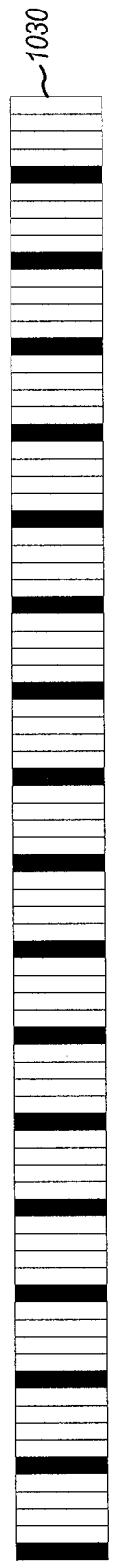

FIGS. 10A-10C illustrate the downlink transmission and uplink reception by a cell in accordance with an eNCT only technique (e.g., LCT cell or LCT+eNCT cell operating in eNCT mode) in the aforementioned off, dormant, and active states respectively.

As illustrated in uplink/downlink frame structure 1010 of FIG. 10A, there is no transmission by the cell in the downlink and no reception by the cell in the uplink when in the off state (i.e., the cell is not operational or "off"). Accordingly, the cells in the off state remain unaware of UEs and the UEs are unable to discover these cells.

As illustrated in uplink/downlink frame structure 1020 of FIG. 10B, there is both sparse transmission by the cell in the downlink and sparse reception by the cell in the uplink when operating in the dormant state. For example, the cell operating in a dormant state in accordance with an eNCT technique may provide periodic transmission of downlink common channels. Additionally, the cell operating in the dormant state in accordance with an eNCT technique may provide periodic reception of signals associated UEs.

In operation according to embodiments, the transmission by a dormant state eNCT cell may comprise one or more low duty cycle (LDC) common channels (e.g., having a periodicity of 40, 80, 160, 320, . . . , 5120 ms) for use by enhanced UEs in detecting the dormant state eNCT cells and possibly making measurements useful in determining the potential effectiveness of the eNCT cell for serving the UE. Downlink common channels transmitted by dormant state eNCT cells of embodiments may, for example, comprise narrowband channels (e.g., 6 RBs). The LDC downlink transmission implemented by dormant state eNCT cells of embodiments provides information identifying the particular eNCT cell making the transmission.

To facilitate efficient operation of idle state UEs, the LDC downlink transmission implemented by dormant state eNCT cells of embodiments is synchronized with that of other cells providing eNCT operation. Each such cell may have a unique tone or other distinguishing aspect to facilitate UEs briefly monitoring a common channel and detecting all cells providing eNCT operation within range of the UE.

Additional information regarding the eNCT cell and/or its communication configuration may be provided in the dormant state transmission. For example, dormant state eNCT cell transmission may comprise PSS and/or SSS (e.g., to provide information such as symbol, subframe, radio frame timing, physical cell identity (PCI), etc. for use by enhanced UEs), PBCH (e.g., to provide information such as system frame number (SFN) timing, antenna and TDD information, etc. for use by enhanced UEs), common reference signal (CRS) (e.g., to provide a signal used by the enhanced UEs for measurements, tracking purposes, etc.), system information block 0 (SIB0) (e.g., to provide information such as unique cell ID, access parameters, etc. for use by enhanced UEs), and/or the like. However, information regarding dormant state eNCT cell transmission is provided to the UEs through other sources according to some embodiments in order to facilitate the use of narrowband dormant state communications in the downlink (e.g., the aforementioned 6 RB channels).

Information regarding the dormant state eNCT cell downlink transmissions may, for example, be signaled to the enhanced UEs by active ones of the LCT cells, eNCT cells, and/or LCT+eNCT cells. For example, downlink common channels transmitted by active cells of embodiments may include eNCT signaling (e.g., signaling to identify the dormant state eNCT cell LDC common channels), PBCH (e.g., to provide information such as system frame number (SFN) timing, antenna and TDD information, etc. for use by enhanced UEs), and/or the like.

As can be appreciated from the foregoing, enhanced UEs (e.g., LTE Rel. 12 UEs) utilized according to embodiments are adapted to monitor the aforementioned dormant state eNCT cell downlink transmissions (e.g., using the aforementioned information) and thus are aware of dormant state eNCT cells in proximity to the UE. For example, enhanced UEs may detect PSS, SSS, PBCH, etc. and measure CRS to identify one or more dormant state eNCT cell as candidates for serving the UE. The UE may report certain measurements regarding the eNCT cells to a serving cell, such as to initiate handover between these cells where appropriate.

The foregoing monitoring of dormant state eNCT cells by enhanced UEs may be performed not only when the UE is operating in a connected state, but also when the UE is operating in an idle state according to embodiments herein. Accordingly, an idle state UE may camp on a dormant state eNCT cell, such as where the dormant state eNCT cell provides paging functionality. Likewise, an idle state UE may initially enter a connected state, from an idle state, with a eNCT cell which correspondingly transitions from a dormant state to an active state according to embodiments herein.

In operation according to embodiments, the UEs for which signals may be monitored by the dormant state eNCT cell may be connected state UEs and/or idle state UEs. For example, communications associated with UEs (e.g., legacy UEs, such as LTE Rel. 8/9/10/11 UEs) operating in a connected state with neighboring serving cells may be monitored by the eNCT cell, as discussed above. Moreover, signals from idle state UEs, and even connected state UEs, (e.g., enhanced UEs, such as LTE Rel. 12 UEs) may be monitored by the dormant state eNCT cell. For example, enhanced UEs, operable in accordance with eNCT techniques herein, may provide transmission of beacon or other signals having timing slaved to the aforementioned dormant state eNCT cell downlink common channel transmission for use by the dormant state cell in monitoring candidate UEs. For example, UEs may transmit specific reserved PRACH signatures, wherein such PRACH signatures may be utilized by dormant state LCT cells to identify UEs served by neighboring cells. The signal characteristics for such signals may be conveyed by neighbor cell to the dormant cells (e.g., using a backhaul link), through static operations, administration, and management (OA&M) provisioning, etc. to facilitate monitoring of the UEs by the dormant state cells.

Cells operating in a dormant state in accordance with eNCT techniques herein may monitor aspects of the communication channel in addition to or in the alternative to the aforementioned signals associated with connected state and idle state UEs. For example, a dormant state eNCT cell may provide periodic IOT measurements for use in detecting UEs (e.g., inferring the presence of UEs) within a service area of the dormant cell.

It can be appreciated from the foregoing that, for eNCT cells operating in a dormant state in accordance with eNCT techniques of embodiments, the dormant state cell can be detected by UEs (e.g., enhanced UEs operable to monitor the foregoing LDC downlink channel), due to the downlink transmission by the dormant state cell. Moreover, the dormant state eNCT cells can detect UEs (e.g., legacy UEs and enhanced UEs) in a connected state with neighboring cells and UEs (e.g., enhanced UEs) in an idle state, such as based upon uplink signals and/or IOT measurements.

Cells operating in an active state in accordance with eNCT techniques herein are not restricted to providing communication in accordance with legacy operation due to the use of enhanced UEs which are themselves adapted for eNCT operation. Accordingly, active state eNCT cells of embodiments provide transmission of high duty cycle (HDC) (e.g., having a periodicity of 5 ms) sparse signals in the downlink, as illustrated in uplink/downlink frame structure 1030 of FIG. 10C. For example, the cell may provide HDC downlink common channel signaling, such as may include PSS (e.g., 5 ms), SSS (e.g., 5 ms), and wideband RS (e.g. 5 ms spanning the entire system bandwidth and used for CSI feedback, tracking, and measurements) in every fifth subframe, PBCH in every tenth subframe, SIB1 in every twentieth subframe, etc. Additionally or alternatively, active state eNCT cell operation may provide unicast and/or multicast control and data transmission (e.g., based on UE RS) in the downlink. Active state eNCT cell operation may likewise comprise unicast control and data transmission (e.g., based on UE RS).

Active state eNCT cells of embodiments operate to provide the same beacon or other signal transmitted in the downlink during the dormant state in order to facilitate UEs monitoring a same downlink aspect for cell selection and control, whether the eNCT cell is in the dormant or active state. Accordingly, active state eNCT cells of embodiments may continue to provide downlink transmission of one or more LDC common channels for use by enhanced UEs in detecting the eNCT cells and possibly making measurements useful in determining the potential effectiveness of the eNCT cell for serving the UE. As discussed above, the LDC downlink transmission implemented by eNCT cells (e.g., dormant state eNCT cells and active state eNCT cells) of embodiments is synchronized with that of other cells providing eNCT operation to facilitate efficient operation of idle state UEs.

The downlink transmissions by an active state eNCT cell may include information in addition to that facilitating communication between the eNCT cell and its served UEs. For example, the active state eNCT cell may provide transmission of information regarding the dormant state eNCT cells. In operation according to embodiments, active state eNCT transmissions include system information block 2 (SIB2) information conveying dormant state eNCT cell common channel periodicity and/or or other information to facilitate detection of the dormant state eNCT cell downlink transmission by the enhanced UEs.

Figure 11:
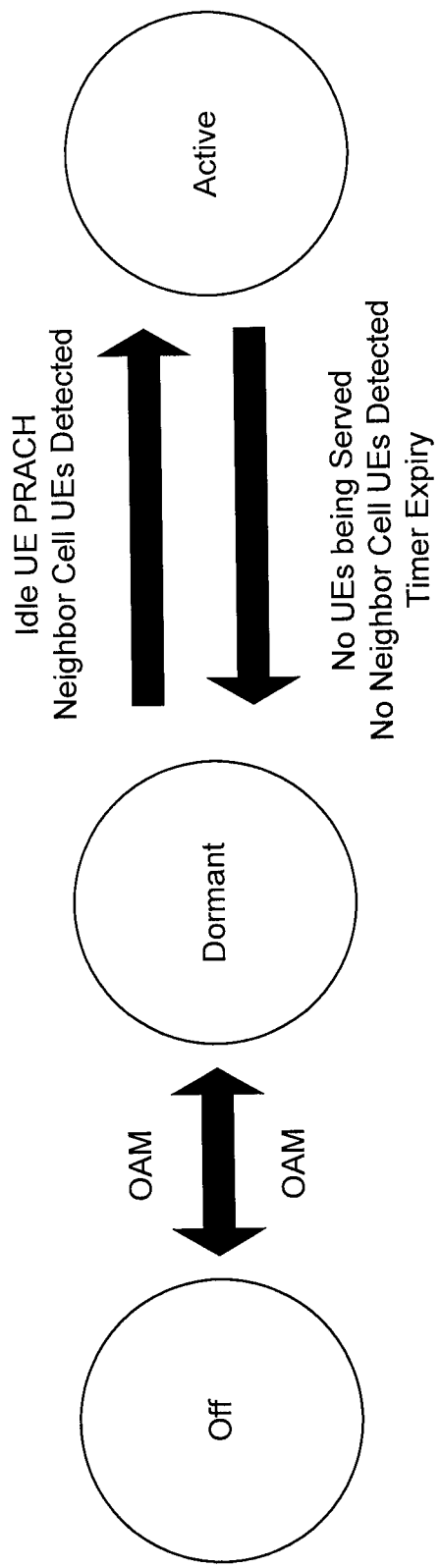
FIG. 11 is a state transition diagram illustrating state transitions by an exemplary enhanced new carrier type cell implementing enhanced new carrier type techniques according to the concepts herein.

As shown in the state transition diagram of FIG. 11, eNCT cells operating in accordance with eNCT techniques (e.g., eNCT cells and LCT+eNCT cells) may transition between the foregoing states as appropriate. For example, a eNCT cell may transition between the off state and the dormant state in accordance with OA&M control. The eNCT cell may transition from the dormant state to the active state in accordance with its monitoring of UEs (e.g., upon detection of a connected state UE being served by a neighboring cell, upon detection of an idle state UE proximate thereto, upon IOT measurements indicative of operation of a nearby connected state UE, etc.), such as when a monitored aspect of the UE indicates the UE may be efficiently and/or effectively served by the previously dormant cell. Once in the active state, the eNCT cell of embodiments provides eNCT operation (e.g., LTE Rel. 12 operation). The eNCT cell may transition from the active state to the dormant state in accordance with its monitoring of UEs (e.g., upon detecting no UEs being served by the LCT cell, upon detecting no UEs in a connected state with a neighboring cell, upon detecting no idle state UEs in proximity thereto, etc.), such as when a threshold amount of time expires without a monitored aspect of the UE indicating the UE may be served by the previously active cell.

Figure 12:
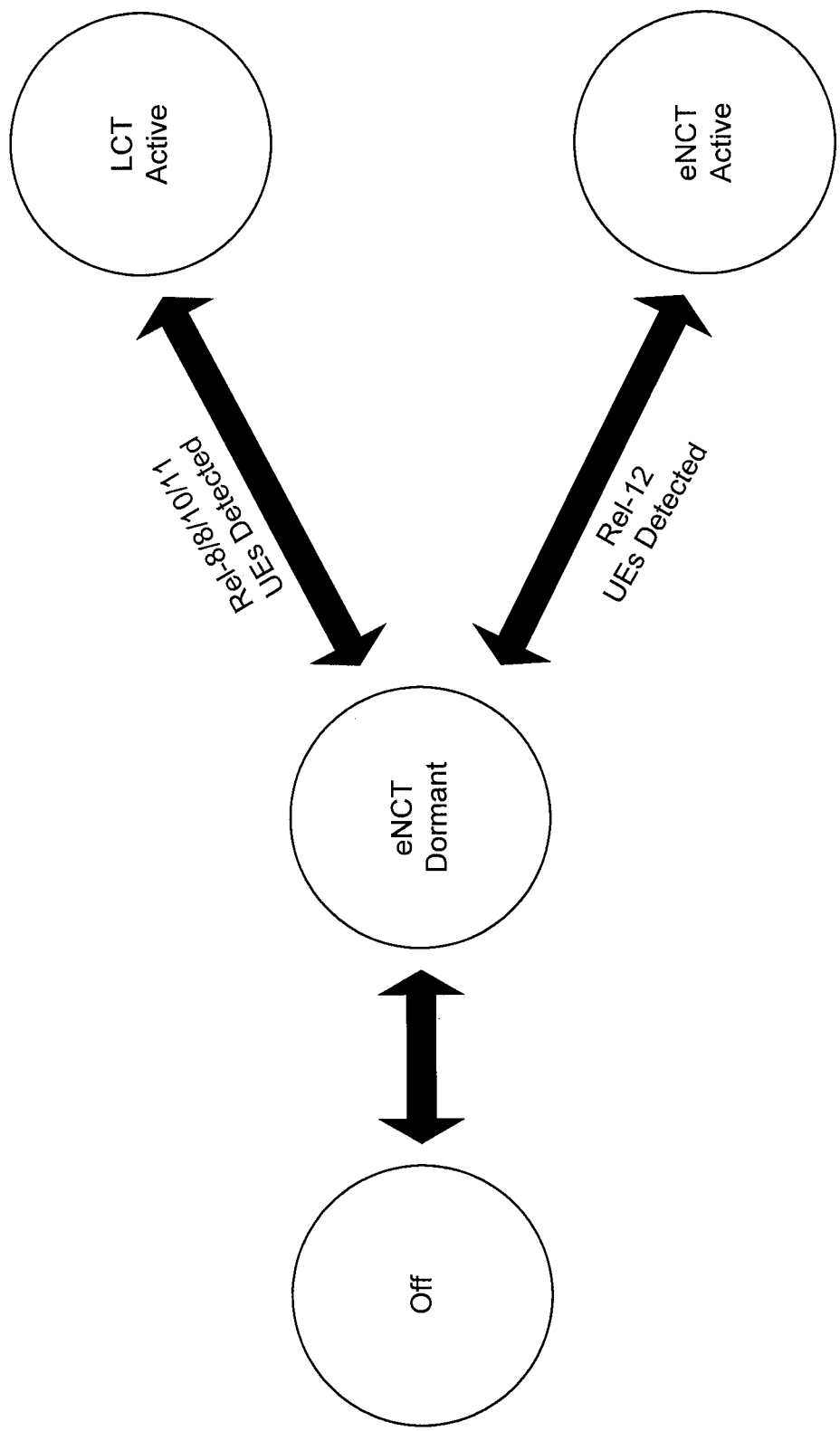
FIG. 12 is a state transition diagram illustrating state transitions by an exemplary legacy carrier type plus enhanced new carrier type cell implementing enhanced new carrier type techniques according to the concepts herein.

The state transition diagram of FIG. 12 shows the transition of an LCT+eNCT from the dormant state to an active state, and may provide for transition to an active state LCT cell mode or an active state eNCT cell mode. The dormant state cell may operate to determine the particular mode to enter the active state in based upon the capabilities of the UEs to be served. The determination may be made, for example, as the cell transitions from the dormant state to the active state. In operation according to embodiments, UEs are periodically triggered by a serving cell to transmit specific reserved PRACH signatures, wherein such PRACH signatures may be utilized by dormant state cells to identify UEs served by neighboring cells. Separation of PRACH may be provided as between legacy UEs (e.g., LTE Rel. 8/9/10/11 UEs) and enhanced UEs (e.g., LTE Rel. 12 UEs), such as through CDM structure (e.g., different sets of sequences or cyclic shifts), FDM structure (e.g., different location of PRACH resource blocks), TDM structure (e.g., different PRACH timing instances), etc. The foregoing PRACH differences may be utilized by LCT+eNCT cells to identify the UE as a legacy UE operable in accordance with LCT cell operation or an enhanced UE operable in accordance with eNCT cell operation. Accordingly, a LCT+eNCT cell may utilize such information, or similar differences in the monitored signaling, when determining whether to enter a LCT cell or eNCT cell active state mode.

Figure 13A:
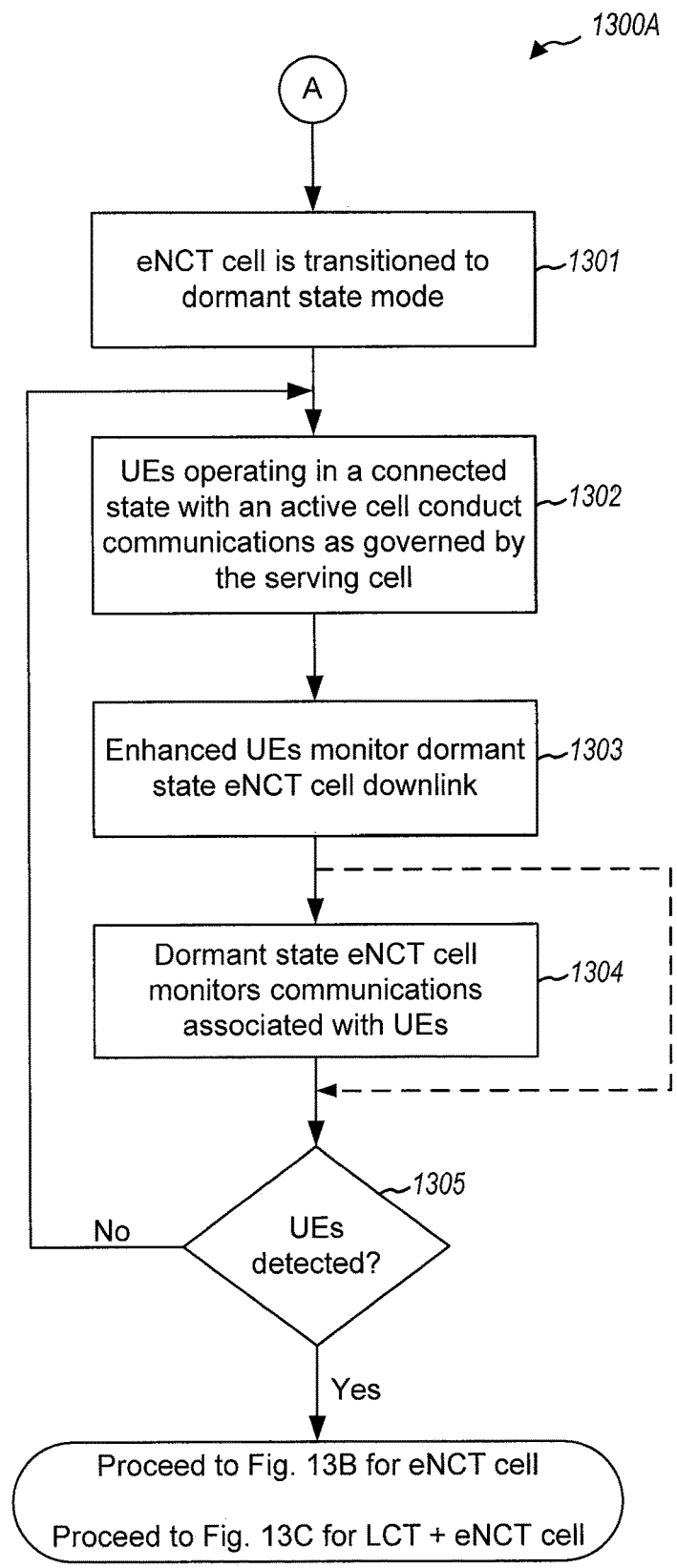
FIGS. 13A-13C are block diagrams showing exemplary operational flows of an enhanced new carrier type cell and a legacy carrier type plus enhanced new carrier type cell implementing enhanced new carrier type techniques according to the concepts herein.
Figure 13B:
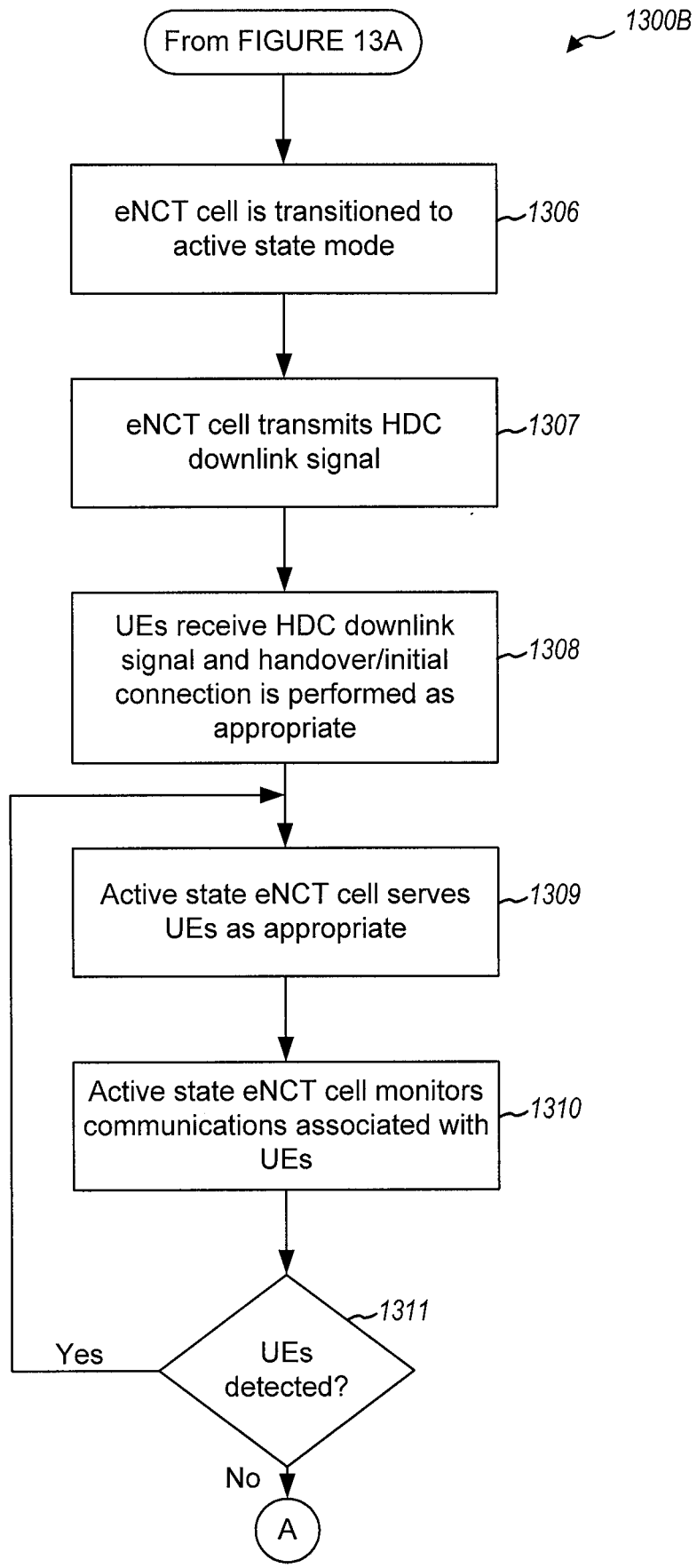

Flows 1300A and 1300B of FIGS. 13A and 13B combine to show operation of a cell (e.g., eNCT cell 610c of FIG. 6) in accordance with eNCT techniques implemented according to embodiments herein. Flows 1300A and 1300C of FIGS. 13A and 13C combine to show operation of a cell (e.g., LCT+eNCT cell 610g of FIG. 6) in accordance with LCT and eNCT techniques implemented according to embodiments herein. It should be appreciated that, according to the illustrated embodiment, a dormant state LCT+ eNCT cell operates as a dormant state eNCT cell to thereby facilitate eNCT operation of enhanced UEs. This dormant state LCT+eNCT cell operation preferably also comprises operation, as discussed below, to facilitate eNCT operation for legacy UEs.

At block 1301 of the illustrated embodiment, the cell (whether an eNCT cell or LCT+eNCT cell) is transitioned to the dormant state. For example, OA&M control may have transition the cell from an off state to the dormant state. Alternatively, the cell may have transitioned to the dormant state from an active state, as will be described below. It should be appreciated that such a dormant state may be a default operational state for one or more cells of a wireless communication network, such as to minimize or otherwise reduce the number of cells providing common channel downlink transmission during times of low network activity.

At block 1302 UEs operating in a connected state with active cells (e.g., e.g., UEs 620a, 620f, and 620l operating in a connected state with LCT+eNCT cell 610e and UEs 620b and 620c operating in a connected state with LCT cell 610b) conduct communications as governed by their serving cell. For example, the UEs may transmit PRACH triggered by the serving cell, e.g., triggered by receiving PDCCH from the serving cell, transmit periodic or aperiodic SRS, transmit periodic PUCCH, etc. In operation according to embodiments herein, UEs are periodically triggered by a serving cell to transmit specific reserved PRACH signatures, wherein such PRACH signatures may be utilized by cells operating in a dormant state to identify UEs served by neighboring cells. The UE transmit power for such transmissions may be a fixed, for example negative, offset with respect to a nominal transmit power that would correspond to serving cell open loop pathloss.

At block 1303 enhanced UEs (e.g., UEs 620f, and 620l) monitor dormant state cell downlink transmission. For example, enhanced UEs operating in an idle state may monitor dormant state cell downlink transmission for identifying an eNCT cell or LCT+eNCT cell in proximity to the UE for activation can connection, as appropriate. Likewise, enhanced UEs operating in a connected state may monitor dormant state cell downlink transmission for reporting to their serving cell for handover, as appropriate.

At block 1304 the dormant state cell (e.g., eNCT cell 610c or LCT+eNCT cell 610g) monitors communications associated with UEs within an area of reception by the cell. For example, eNCT cell 610c may monitor communications associated with UE 620l being served by neighboring LCT+ eNCT cell 610e, assuming in this example that UEs 620j and 620k are currently not actively operating. Similarly, LCT+ eNCT cell 610g may monitor communications associated with UE 620c being served by neighboring LCT cell 610b, assuming in this example that UEs 620d and 620i are not actively operating. In operation according to embodiments, the dormant state cell (e.g., eNCT cell 610c or LCT+eNCT cell 610g) may detect the aforementioned PRACH signatures when transmitted by the UEs and thus infer the presence of the neighboring cell UE.

A determination is made by the dormant state cell as to whether UEs are detected at block 1305. For example, the dormant state cell (e.g., eNCT cell 610c or LCT+eNCT cell 610g) may determine whether any instance of the reserved PRACH signatures have been received so as to indicate that the UE may be efficiently and/or effectively served by the cell. If it is determined that no such UE has been detected by the dormant state cell, processing according to the illustrated embodiment returns to block 1302 for continued service of the UEs by the active cells. However, if it is determined that such a UE has been detected by the dormant state LCT cell, processing according to the illustrated embodiment proceeds to either flow 1300B of FIG. 13B in the case of an eNCT cell or 1300C of FIG. 13C in the case of a LCT+eNCT cell.

In accordance with another example, the dormant state cell may be provided information regarding UEs which may be served by the dormant state cell for use in state transitioning. For example, an enhanced UE may monitor a dormant state eNCT cell downlink and report this information to the cell serving the UE (e.g., at block 1303 discussed above). The cell serving that UE may prompt the dormant state eNCT cell, such as using backhaul communications, to transition to active mode, thereby facilitating omitting the monitoring of UEs by the eNCT cell as represented by the dotted line shown in flow 1300A.

Assuming first the case that the dormant state cell is an eNCT cell, processing proceeds from block 1305 of FIG. 13A to block 1306 of FIG. 13B. At block 1306 the dormant state eNCT cell is transitioned to the active state. For example, eNCT cell 610c may transition from dormant state operation to active state operation as represented in the state transition diagram of FIG. 11. When operating in the active state according to embodiments herein, an eNCT cell provides operation according to eNCT techniques herein.

Accordingly, at block 1307 the eNCT cell transmits a HDC downlink signal, as discussed above. The UEs within reception range of the now active state eNCT cell may receive the HDC downlink signal and operate to initiate handover or initial connect to the eNCT cell as appropriate at block 1308. For example, UE 620l operating in a connected state with LCT+eNCT cell 610e may receive the HDC downlink signal from eNCT 610c, make one or more measurements, and report to the serving cell for handover to eNCT 610c in accordance with eNCT techniques herein. Similarly, UE 620j operating in an idle state may receive the HDC downlink signal and, when operable to initiate a connected state, may initiate the connected state with eNCT cell 610c. In operation according to embodiments, CRE techniques may be implemented with respect to the handover to cell having transitioned from the dormant state to the active state.

At block 1309 the active state eNCT cell serves UEs as appropriate. For example, where UE 620l is handed over to eNCT cell 610c from LCT+eNCT cell 610e, eNCT cell 610c may serve UE 620l in a connected state until handoff is provided in accordance with the network operation or the communication session is terminated.

At block 1310 the active state eNCT cell monitors UE communications for determining whether the active state is to be maintained. For example, eNCT cell 610c may monitor UEs served by the eNCT cell to determine when no UEs are being served by the eNCT cell. Additionally or alternatively, eNCT cell 610c may monitor UEs (e.g., UEs 620i) served by neighboring cells (e.g., LCT+eNCT cell 610g) which are operating within a reception area of eNCT cell 610c that are candidates for service by eNCT cell 610c.

A determination is made by the active state eNCT cell as to whether UEs are detected at block 1311. For example, eNCT cell 610c may determine whether any UE is being served by the cell or any instance of the reserved PRACH signature has been received so as to indicate that a UE may be efficiently and/or effectively served by eNCT cell 610c. If it is determined that such a UE has been detected by the active state eNCT cell, processing according to the illustrated embodiment returns to block 1309 for continued operation of the eNCT cell in the active state. However, if it is determined that no such UE has been detected by the active state eNCT cell within some threshold period of time (e.g., a few seconds or minutes), processing according to the illustrated embodiment returns to block 1301 wherein the active state eNCT cell is transitioned to the dormant state.

Figure 13C:
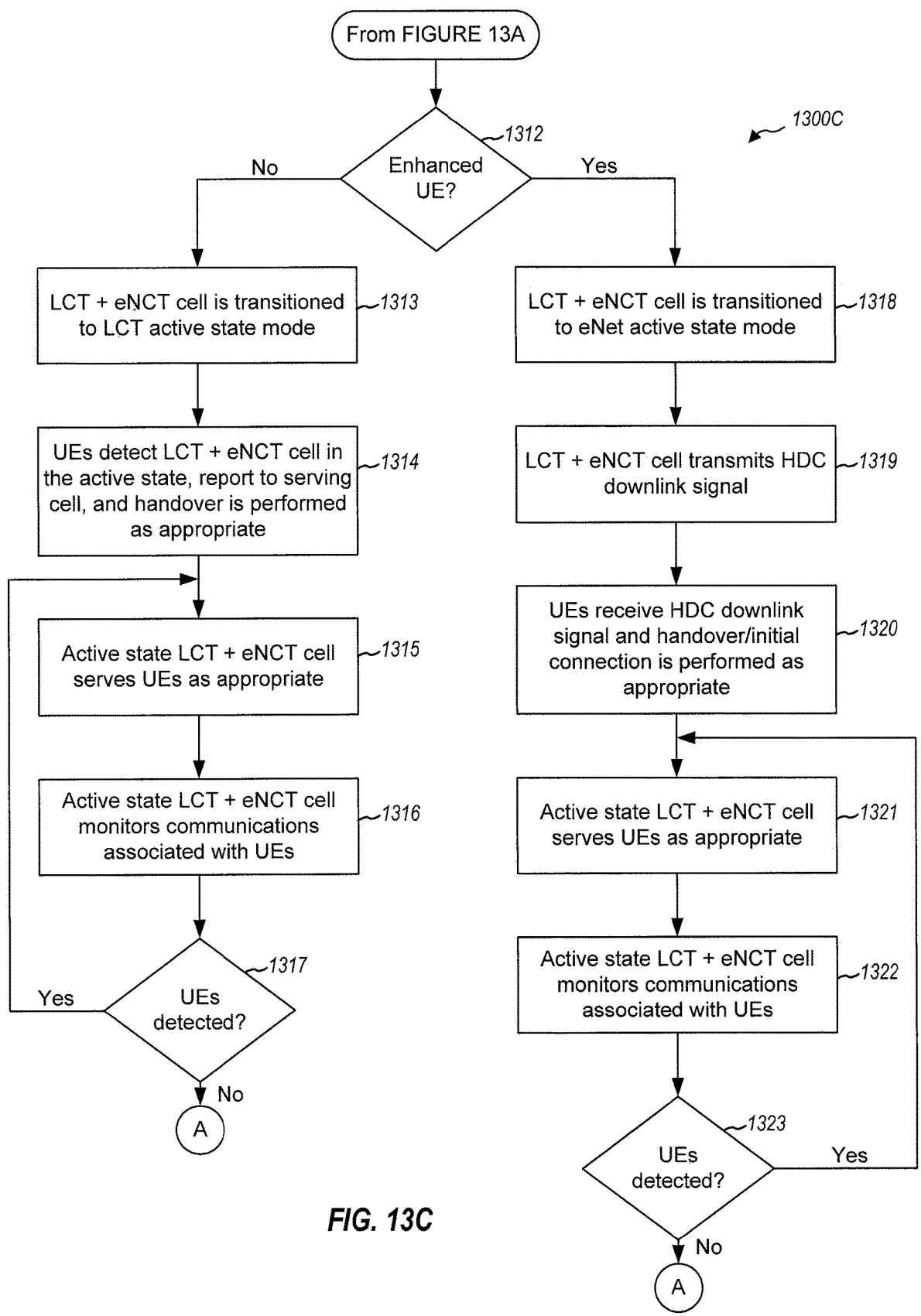

Assuming now the case that the dormant state cell is a LCT+eNCT cell, processing proceeds from block 1305 of FIG. 13A to block 1312 of FIG. 13C. At block 1312 a decision is made as to whether the UE detected is an enhanced UE. If the UE is not an enhanced UE (i.e., the UE is a legacy UE), the LCT+eNCT cell may operate in LCT cell mode and thus processing according to the illustrated embodiment proceeds to block 1313.

At block 1313 the dormant state LCT cell is transitioned to the active state. For example, LCT+eNCT cell 610g may transition from dormant state operation to LCT cell mode active state operation as represented in the state transition diagram of FIG. 12. When operating in the LCT cell mode active state according to embodiments herein, a LCT+eNCT cell provides normal legacy cell type operation.

Accordingly, at block 1314 the UEs within reception range of the now active state LCT+eNCT cell may detect the LCT+eNCT cell in accordance with normal operation. For example, UE 620c may now detect active state LCT+eNCT cell 610g. Upon detection of the active state LCT+eNCT cell, the UE may report certain measurements regarding the LCT+eNCT cell to the serving cell (e.g., LCT cell 610b) and handover between these cells (LCT cell 610b and LCT+eNCT cell 610g) may be performed in accordance with normal procedures (e.g., signal strengths, traffic balancing, etc.). In operation according to embodiments, CRE techniques may be implemented with respect to the handover to cell having transitioned from the dormant state to the active state.

At block 1315 the active state LCT+eNCT cell serves UEs as appropriate. For example, where UE 620c is handed over to LCT+eNCT cell 610g from LCT cell 610b, LCT+eNCT cell 610g may serve UE 620c in a connected state until handoff is provided in accordance with the network operation or the communication session is terminated.

At block 1316 the active state LCT+eNCT cell monitors UE communications for determining whether the active state is to be maintained. For example, LCT+eNCT cell 610g may monitor UEs served by the LCT+eNCT cell to determine when no UEs are being served by the LCT+eNCT cell. Additionally or alternatively, LCT+eNCT cell 610g may monitor UEs (e.g., UE 620j and UE 620h) served by neighboring cells (e.g., eNCT cell 610c and eNCT cell 610d) which are operating within a reception area of LCT+eNCT cell 610g that are candidates for service by LCT+eNCT cell 610g.

A determination is made by the active state LCT+eNCT cell as to whether UEs are detected at block 1317. For example, LCT+eNCT cell 610g may determine whether any UE is being served by the cell or any instance of the reserved PRACH signature has been received so as to indicate that a UE may be efficiently and/or effectively served by LCT+eNCT cell 610g. If it is determined that such a UE has been detected by the active state LCT+eNCT cell, processing according to the illustrated embodiment returns to block 1315 for continued operation of the LCT+eNCT cell in the active state. However, if it is determined that no such UE has been detected by the active state LCT+eNCT cell within some threshold period of time (e.g., a few seconds or minutes), processing according to the illustrated embodiment returns to block 1301 wherein the active state LCT+eNCT cell is transitioned to the dormant state.

If, at block 1312, it was determined that the UE is an enhanced UE, the LCT+eNCT cell may operate in eNCT cell mode and thus processing according to the illustrated embodiment proceeds to block 1318 wherein the dormant state eNCT cell is transitioned to the active state. For example, LCT+eNCT cell 610g may transition from dormant state operation to eNCT mode active state operation as represented in the state transition diagram of FIG. 12. When operating in the eNCT mode active state according to embodiments herein, a LCT+eNCT cell provides operation according to eNCT techniques herein.

Accordingly, at block 1319 the LCT+eNCT cell transmits a HDC downlink signal, as discussed above. The UEs within reception range of the now active state LCT+eNCT cell may receive the HDC downlink signal and operate to initiate handover or initial connect to the LCT+eNCT cell as appropriate at block 1320. For example, UE 620c operating in a connected state with LCT cell 610b may receive the HDC downlink signal from LCT+eNCT 610g, make one or more measurements, and report to the serving cell for handover to LCT+eNCT 610g in accordance with eNCT techniques herein. Similarly, UE 620d operating in an idle state may receive the HDC downlink signal and, when operable to initiate a connected state, may initiate the connected state with LCT+eNCT cell 610g. In operation according to embodiments, CRE techniques may be implemented with respect to the handover to cell having transitioned from the dormant state to the active state.

At block 1321 the active state LCT+eNCT cell serves UEs as appropriate. For example, where UE 620c is handed over to LCT+eNCT cell 610g from LCT cell 610b, LCT+eNCT cell 610g may serve UE 620c in a connected state until handoff is provided in accordance with the network operation or the communication session is terminated.

At block 1322 the active state LCT+eNCT cell monitors UE communications for determining whether the active state is to be maintained. For example, LCT+eNCT cell 610g may monitor UEs served by the LCT+eNCT cell to determine when no UEs are being served by the LCT+eNCT cell. Additionally or alternatively, LCT+eNCT cell 610g may monitor UEs (e.g., UEs 620j and 620h) served by neighboring cells (e.g., eNCT cell 610c and eNCT cell 610d) which are operating within a reception area of LCT+eNCT cell 610g that are candidates for service by LCT+eNCT cell 610g.

A determination is made by the active state LCT+eNCT cell as to whether UEs are detected at block 1323. For example, LCT+eNCT cell 610g may determine whether any UE is being served by the cell or any instance of the reserved PRACH signature has been received so as to indicate that a UE may be efficiently and/or effectively served by LCT+eNCT cell 610g. If it is determined that such a UE has been detected by the active state LCT+eNCT cell, processing according to the illustrated embodiment returns to block 1321 for continued operation of the LCT+eNCT cell in the active state. However, if it is determined that no such UE has been detected by the active state LCT+eNCT cell within some threshold period of time (e.g., a few seconds or minutes), processing according to the illustrated embodiment returns to block 1301 wherein the active state LCT+eNCT cell is transitioned to the dormant state.

From the foregoing, it can be appreciated that cells may switch between eNCT and LCT modes, such as based upon the mix of UE types detected in the network. Preferably, eNCT compliant UEs (i.e., enhanced UEs) are backwardly compatible (i.e., capable of LCT mode operation). Accordingly, the presence of a legacy UE to be served by a LCT+eNCT cell may result in LCT mode active state operation wherein both legacy UEs and enhanced UEs are served by the LCT+eNCT cell.

The tables below provide a summary of cell states and operational aspects described with respect to the foregoing exemplary embodiments:

Cell States

| Cell Type/Mode | Off | Dormant | Active |
| --- | --- | --- | --- |
| LCT | Cell is switched off Incapable of being detected | No transmission in downlink Periodic reception of uplink signals from connected state UEs of neighbor cells | Legacy cell type operation |
| eNCT | Cell is switched off Incapable of being detected | Periodic LDC transmission of downlink common channels Periodic reception of uplink signals from UEs of neighbor cells | Periodic HDC transmission of downlink common channels User specific downlink and uplink control plus data transmission/reception |

Cell Detection by UEs

| Cell State | Idle State UE | Connected State UE |
| --- | --- | --- |
| Dormant state LCT cell | No | No |
| Dormant state eNCT cell | Yes (enhanced UE) | Yes (enhanced UE) |
| Active state LCT cell | Yes (legacy UE and enhanced UE) | Yes (legacy UE and enhanced UE) |
| Active state eNCT cell | Yes (enhanced UE) | Yes (enhanced UE) |

UE Detection by Dormant Cells

| UE State | Dormant LCT Cell | Dormant eNCT Cell |
| --- | --- | --- |
| Idle state | No | No |
| Connected state | Yes (legacy UE and enhanced UE) | Yes (legacy UE and enhanced UE) |

Although exemplary embodiments have been described herein with reference to a single cell serving a UE, it should be appreciated that techniques such as carrier aggregation may be implemented with respect to eNCT operation herein. For example, carrier aggregation capable legacy UEs may be cross-carrier scheduled to utilize a eNCT cell (e.g., a LCT cell may provide a primary carrier and the eNCT cell may provide a secondary carrier).

As can be appreciated from the flow diagrams of the exemplary embodiments, interworking between the various cells, and even the various types of cells (e.g., LCT cells, eNCT cells, and/or LCT+eNCT cells), may be utilized to facilitate operation of eNCT techniques. For example, active state LCT cells may operate to facilitate eNCT cell and LCT+eNCT cell eNCT mode operation. Additionally or alternatively, active state eNCT cells may operate to facilitate eNCT cell and LCT+eNCT cell eNCT mode operation.

In one example of active state LCT cell operation facilitating eNCT cell and LCT+eNCT cell eNCT mode operation, eNCT cells are SFN synchronous with LCT cells. The LCT cells may provide relevant eNCT cell information, such as radio frame (PSS, SSS) and SFN timing (PBCH), common channel periodicity of dormant eNCT cells, etc. to enhanced UEs (e.g., LTE Rel. 12 UEs). For example, the foregoing information may be provided to an idle state enhanced UE camped on an active state LCT cell. When the enhanced UE transitions to the connected state (e.g., in response to a page from an active state cell), the enhanced UE may utilize the foregoing information to enter the connected state directly with an eNCT cell. The eNCT cell may be in a dormant or active state (e.g., an active state cell providing a page to the UE may provide a backhaul message to a dormant state eNCT cell to cause its transition from the dormant state to an active state). Alternatively, the enhanced UE may enter the connected state with the LCT cell and handoff to the eNCT cell may be implemented.

It should be appreciated that cells operating in a dormant state according to the concepts herein may be adapted to support idle state UEs camping on the dormant state cells. For example, the dormant state downlink transmissions of a dormant state eNCT cell may be adapted to include paging and/or other messages for facilitating idle state UEs camping on the dormant state eNCT cell.

Figure 14:
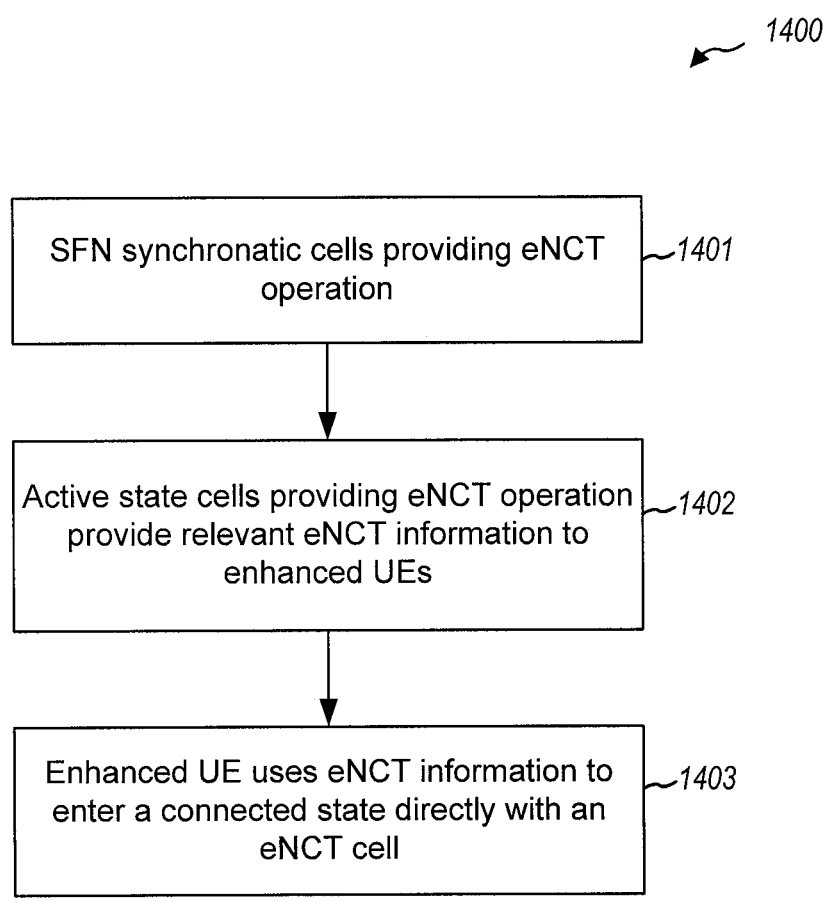
FIG. 14 is a block diagram showing an exemplary operational flow in which active state enhanced new carrier type cell operation facilitates enhanced new carrier type mode operation of cells.

In one example of active state eNCT cell operation facilitating eNCT cell and LCT+eNCT cell eNCT mode operation, as shown by flow 1400 of FIG. 14, all eNCT cells are SFN synchronized (block 1401). Active state eNCT cells provide relevant eNCT cell information, such as radio frame (PSS, SSS) and SFN timing (PBCH), common channel periodicity of dormant eNCT cells, etc. to enhanced UEs (block 1402). For example, the foregoing information may be provided to an idle state enhanced UE camped on a dormant state eNCT cell. When the enhanced UE transitions to the connected state, the enhanced UE may utilize the foregoing information to enter the connected state directly with an eNCT cell (block 1403), such as by sending PRACH directly to the dormant state eNCT cell. The eNCT cell may be a different eNCT cell than that camped on by the enhanced UE and may have been in the dormant state or active state.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 5 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    monitoring, by a first cell, one or more characteristics of a wireless signal associated with a user equipment (UE) which is in a connected state with a second cell, wherein the first cell is operable in a plurality of cell operational states including a dormant operational state and an active operational state;
    operating the first cell in the dormant operational state so as not to serve the UE by providing, by the first cell, a periodic low duty cycle (LDC) transmission of a narrowband channel in a downlink to the UE in the connected state with the second cell;
    receiving, by the first cell in the dormant operational state, a beacon signal from the UE, the beacon signal having timing based on the periodic LDC transmission of the narrowband channel;
    transitioning the first cell from the dormant operational state to the active operational state based on the one or more monitored characteristics of the wireless signal at a first time, wherein transitioning the first cell from the dormant operational state to the active operational state is based on the received beacon signal;
    operating the first cell in the active operational state so as to serve the UE, wherein the operating so as to serve the UE comprises:
        providing, by the first cell, periodic high duty cycle (HDC) transmission;
        performing UE specific transmission in the downlink to the UE in the connected state with the second cell; and
        performing UE specific reception, by the first cell, in an uplink from the UE in the connected state with the second cell; and
    transitioning the first cell from the active operational state to the dormant operational state based on the one or more monitored characteristics of the wireless signal at a second time.

2. The method of claim 1, wherein the operating so as not to serve the UE comprises performing periodic reception, by the first cell, in the uplink from the UE in the connected state with the second cell.

3. The method of claim 2, wherein the periodic LDC transmission of the narrowband channel by the first cell is synchronized with periodic LDC transmission of the narrowband channel by one or more other cells in a wireless communication network.

4. The method of claim 3, wherein the periodic LDC transmission of the narrowband channel by the first cell and the one or more other cells are each transmitted via a unique tone.

5. The method of claim 3, wherein the one or more other cells comprise a cell operable in the dormant operational state.

6. The method of claim 1, wherein the wireless signal includes a random access channel signal (RACH) preamble triggered by the second cell.

7. The method of claim 1, wherein the monitoring the one or more characteristics of the wireless signal includes monitoring an interference over thermal (IOT) measurement of a communication channel between the UE and the second cell.

8. The method of claim 1, further comprising receiving, by the first cell from the second cell, an indication of the one or more characteristics to be monitored by the first cell.

9. The method of claim 1, wherein the narrowband channel corresponds to six or fewer resource blocks (RBs).

10. The method of claim 1, wherein the narrowband channel includes a primary synchronization signal (PSS), a secondary synchronization signal (SSS), a physical broadcast channel (PBCH), a system information block 0 (SIB0), or a combination thereof.

11. The method of claim 1, wherein one or more parameters corresponding to the narrowband channel are communicated to the UE by signaling from the second cell.

12. The method of claim 11, wherein the signaling comprises a system information block 2 (SIB2) from the second cell, and wherein the one or more parameters indicate a periodicity of the LDC transmission of the narrowband channel by the first cell.

13. The method of claim 1, wherein the periodic HDC transmission includes a primary synchronization signal (PSS), a secondary synchronization signal (SSS), a wideband channel state information (CSI) feedback reference signal (RS), a system information block 1 (SIB1), or a combination thereof.

14. An apparatus configured for wireless communication, comprising:
  means for monitoring, by a first cell, one or more characteristics of a wireless signal associated with a user equipment (UE) which is in a connected state with a second cell, wherein the first cell is operable in a plurality of cell operational states including a dormant operational state and an active operational state;
  means for operating the first cell in the dormant operational state so as not to serve the UE by providing, by the first cell, a periodic low duty cycle (LDC) transmission of a narrowband channel in a downlink to the UE in the connected state with the second cell;
  means for receiving, by the first cell in the dormant operational state, a beacon signal from the UE, the beacon signal having timing based on the periodic LDC transmission of the narrowband channel;
  means for transitioning the first cell from the dormant operational state to the active operational state based on the one or more monitored characteristics of the wireless signal at a first time, wherein transitioning the first cell from the dormant operational state to the active operational state is based on the received beacon signal;
  means for operating the first cell in the active operational state so as to serve the UE, wherein the means for operating so as to serve the UE comprises:
    means for providing, by the first cell, periodic high duty cycle (HDC) transmission;
    means for performing UE specific transmission in the downlink to the UE in the connected state with the second cell; and
    means for performing UE specific reception, by the first cell, in an uplink from the UE in the connected state with the second cell; and
  means for transitioning the first cell from the active operational state to the dormant operational state based on the one or more monitored characteristics of the wireless signal at a second time.

15. The apparatus of claim 14, wherein the means for operating so as not to serve the UE comprises means for performing periodic reception, by the first cell, in the uplink from the UE in the connected state with the second cell.

16. The apparatus of claim 15, wherein the periodic LDC transmission of the narrowband channel by the first cell is synchronized with periodic LDC transmission of the narrowband channel by one or more other cells in a wireless communication network.

17. The apparatus of claim 16, wherein the one or more other cells comprise a cell operable in the active operational state.

18. The apparatus of claim 16, wherein the one or more other cells comprise a cell operable in the dormant operational state.

19. The apparatus of claim 14, wherein the wireless signal includes a reserved physical RACH (PRACH) signature that identifies the UE.

20. A computer program product for wireless communications in a wireless network, comprising:
  a non-transitory computer-readable medium having program code recorded thereon, the program code including:
    program code to monitor, by a first cell, one or more characteristics of a wireless signal associated with a user equipment (UE) which is in a connected state with a second cell, wherein the first cell is operable in a plurality of cell operational states including a dormant operational state and an active operational state;
    program code to operate the first cell in the dormant operational state so as not to serve the UE by providing, by the first cell, a periodic low duty cycle (LDC) transmission of a narrowband channel in a downlink to the UE in the connected state with the second cell;
    program code to receive, by the first cell in the dormant operational state, a beacon signal from the UE, the beacon signal having timing based on the periodic LDC transmission of the narrowband channel;
    program code to transition the first cell from the dormant operational state to the active operational state based on the one or more monitored characteristics of the wireless signal at a first time, wherein transitioning the first cell from the dormant operational state to the active operational state is based on the received beacon signal;
    program code to operate the first cell in the active operational state so as to serve the UE, wherein the program code to operate so as to serve the UE comprises:
      program code to provide, by the first cell, periodic high duty cycle (HDC) transmission;
      program code to perform UE specific transmission in the downlink to the UE in the connected state with the second cell; and
      program code to perform UE specific reception, by the first cell, in an uplink from the UE in the connected state with the second cell; and
    program code to transition the first cell from the active operational state to the dormant operational state based on the one or more monitored characteristics of the wireless signal at a second time.

21. The computer program product of claim 20, wherein the program code to operate the first cell in the dormant operational state so as not to serve the UE comprises program code to perform periodic reception, by the first cell, in the uplink from the UE in the connected state with the second cell.

22. The computer program product of claim 20, wherein the wireless signal includes a sounding reference signal (SRS).

23. An apparatus configured for wireless communication, the apparatus comprising:
　at least one processor; and
　a memory coupled to the at least one processor,
　wherein the at least one processor is configured to cause the apparatus to:
　　monitor, by a first cell, one or more characteristics of a wireless signal associated with a user equipment (UE) which is in a connected state with a second cell, wherein the first cell is operable in a plurality of cell operational states including a dormant operational state and an active operational state;
　　operate the first cell in the dormant operational state so as not to serve the UE by providing, by the first cell, a periodic low duty cycle (LDC) transmission of a narrowband channel in a downlink to the UE in the connected state with the second cell;
　　receive, by the first cell in the dormant operational state, a beacon signal from the UE, the beacon signal having timing based on the periodic LDC transmission of the narrowband channel;
　　transition the first cell from the dormant operational state to the active operational state based on the one or more monitored characteristics of the wireless signal at a first time, wherein transitioning the first cell from the dormant operational state to the active operational state is based on the received beacon signal;
　　operate the first cell in the active operational state so as to serve the UE, wherein to operate so as to serve the UE comprises:
　　　provide, by the first cell, periodic high duty cycle (HDC) transmission;
　　　perform UE specific transmission in the downlink to the UE in the connected state with the second cell; and
　　　perform UE specific reception, by the first cell, in an uplink from the UE in the connected state with the second cell; and
　　transition the first cell from the active operational state to the dormant operational state based on the one or more monitored characteristics of the wireless signal at a second time.

24. The apparatus of claim 23, wherein the at least one processor configured to operate so as not to serve the UE is configured to perform periodic reception, by the first cell, in the uplink from the UE in the connected state with the second cell.

25. The apparatus of claim 23, wherein the wireless signal includes a physical uplink control channel (PUCCH) signal.

* * * * *